United States Patent [19]

Struger et al.

[11] Patent Number: 4,488,258
[45] Date of Patent: Dec. 11, 1984

[54] PROGRAMMABLE CONTROLLER WITH CONTROL PROGRAM COMMENTS

[75] Inventors: Odo J. Struger, Chagrin Falls; Jon F. Gray, Eastlake, both of Ohio

[73] Assignee: Allen-Bradley, Milwaukee, Wis.

[21] Appl. No.: 420,023

[22] Filed: Sep. 20, 1982

[51] Int. Cl.³ ............................................. G06F 9/06
[52] U.S. Cl. .................................................. 364/900
[58] Field of Search ... 364/200 MS File, 900 MS File, 364/146, 188, 189, 191, 192

[56] References Cited

U.S. PATENT DOCUMENTS

| | | | |
|---|---|---|---|
| 4,006,464 | 2/1977 | Landell | 364/146 X |
| 4,012,725 | 3/1977 | Spangler et al. | 364/200 |
| 4,118,789 | 10/1978 | Casto et al. | 364/900 |
| 4,200,915 | 4/1980 | Struger et al. | 364/146 X |
| 4,446,525 | 5/1984 | Hoch et al. | 364/900 X |

Primary Examiner—Harvey E. Springborn
Attorney, Agent, or Firm—Barry E. Sammons

[57] ABSTRACT

The control program for a programmable controller is entered and edited through a program terminal which displays the control program symbolically as a ladder diagram. Comment instructions are entered into the control program and associated comment data is entered and stored. The comment data is subsequently displayed by the program terminal along with the ladder diagram rung containing the comment instruction.

4 Claims, 22 Drawing Figures

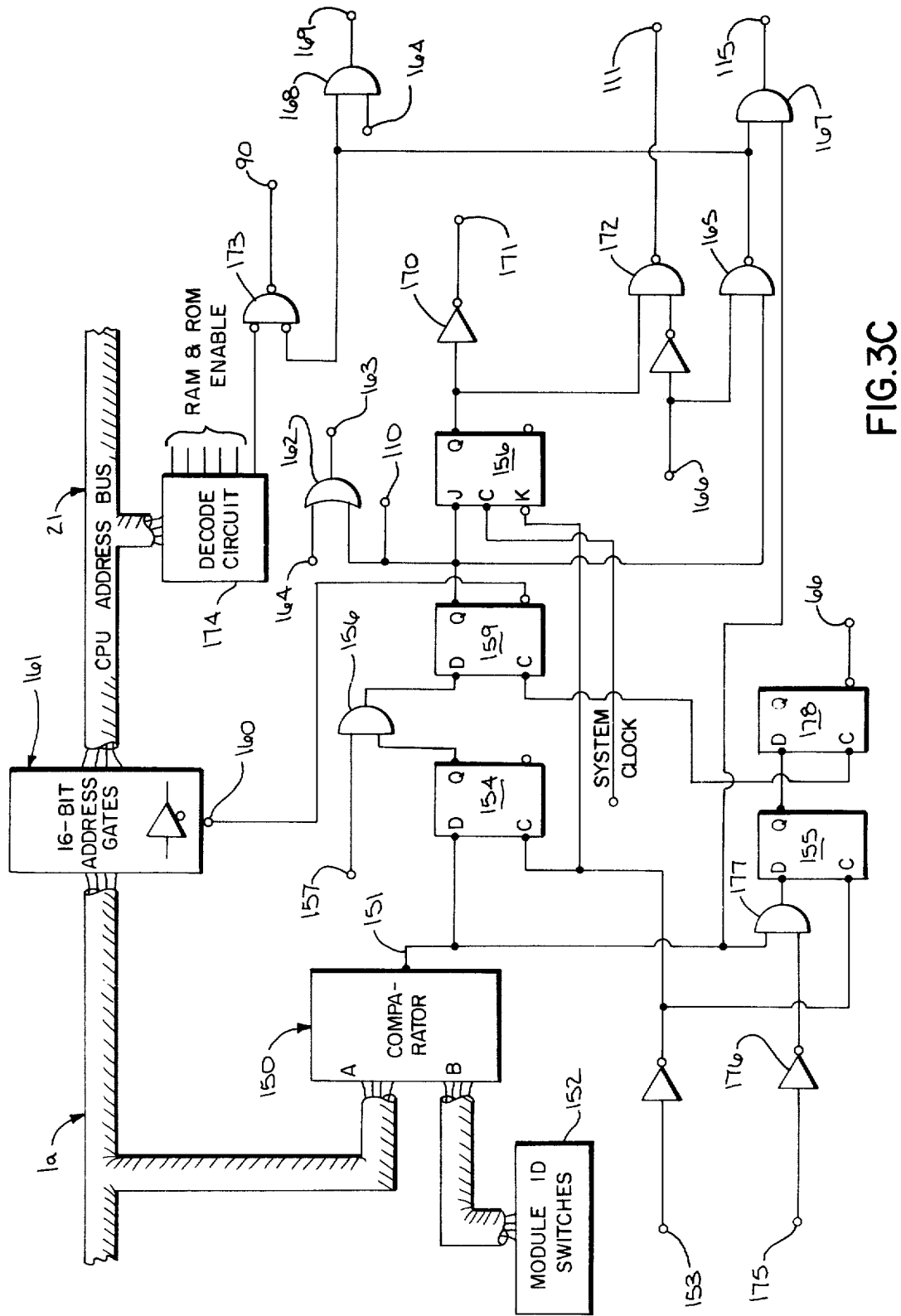

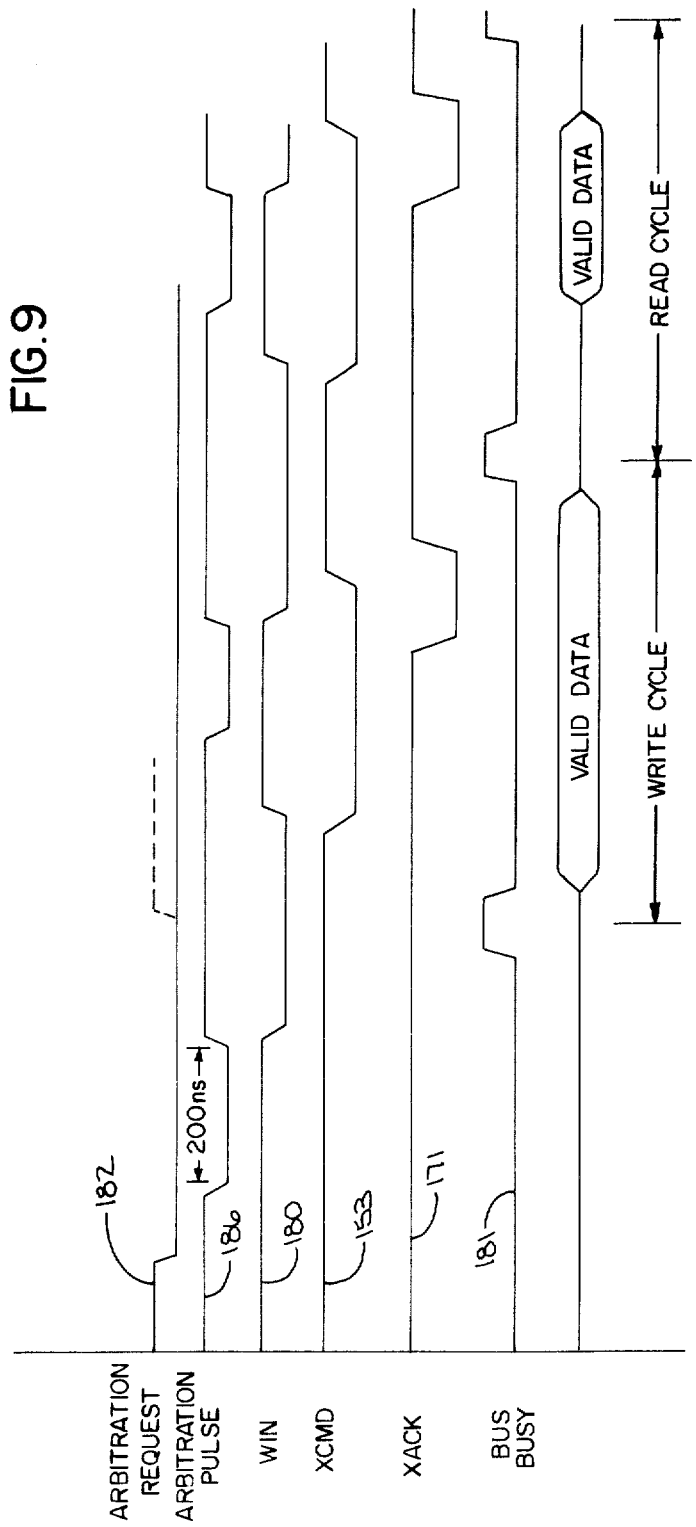

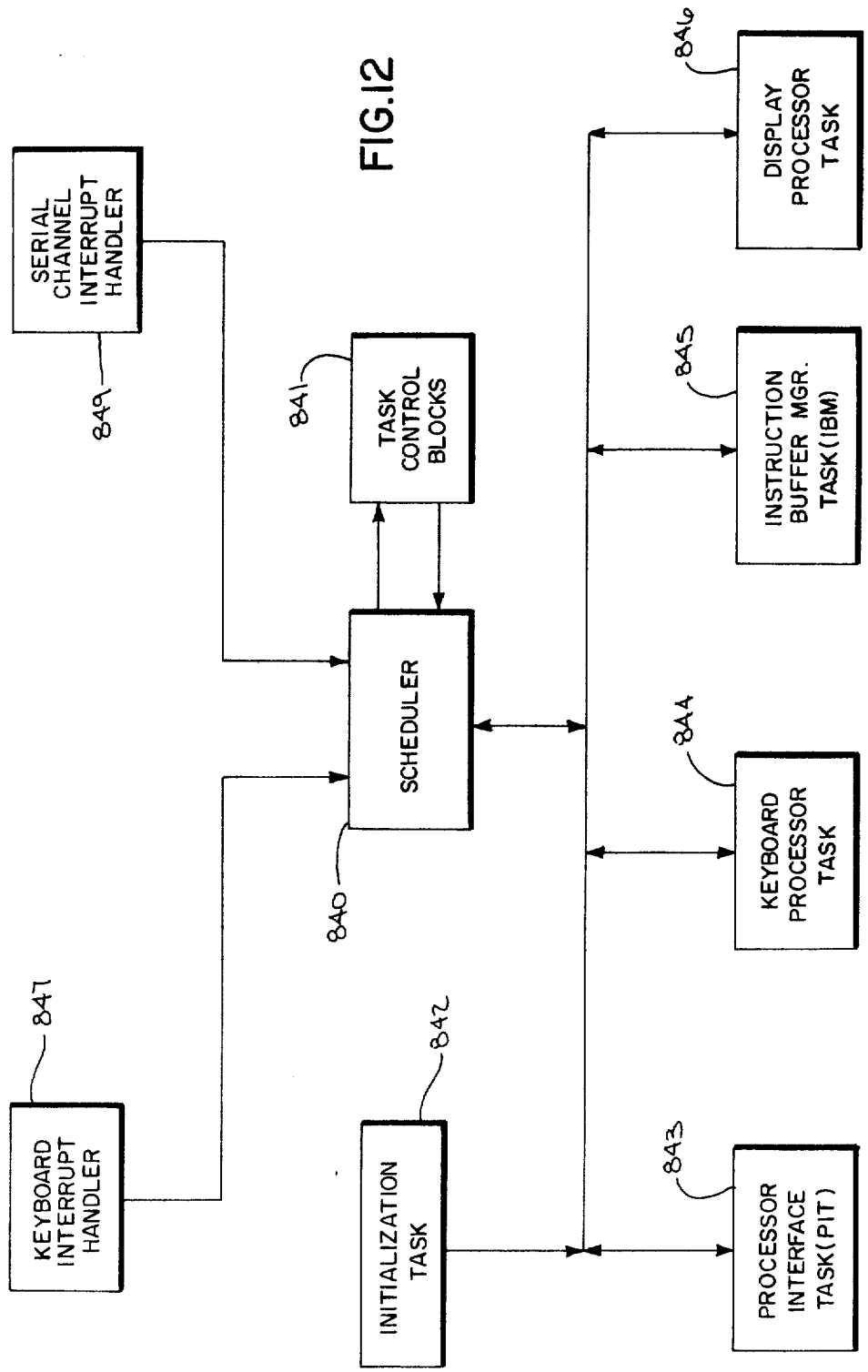

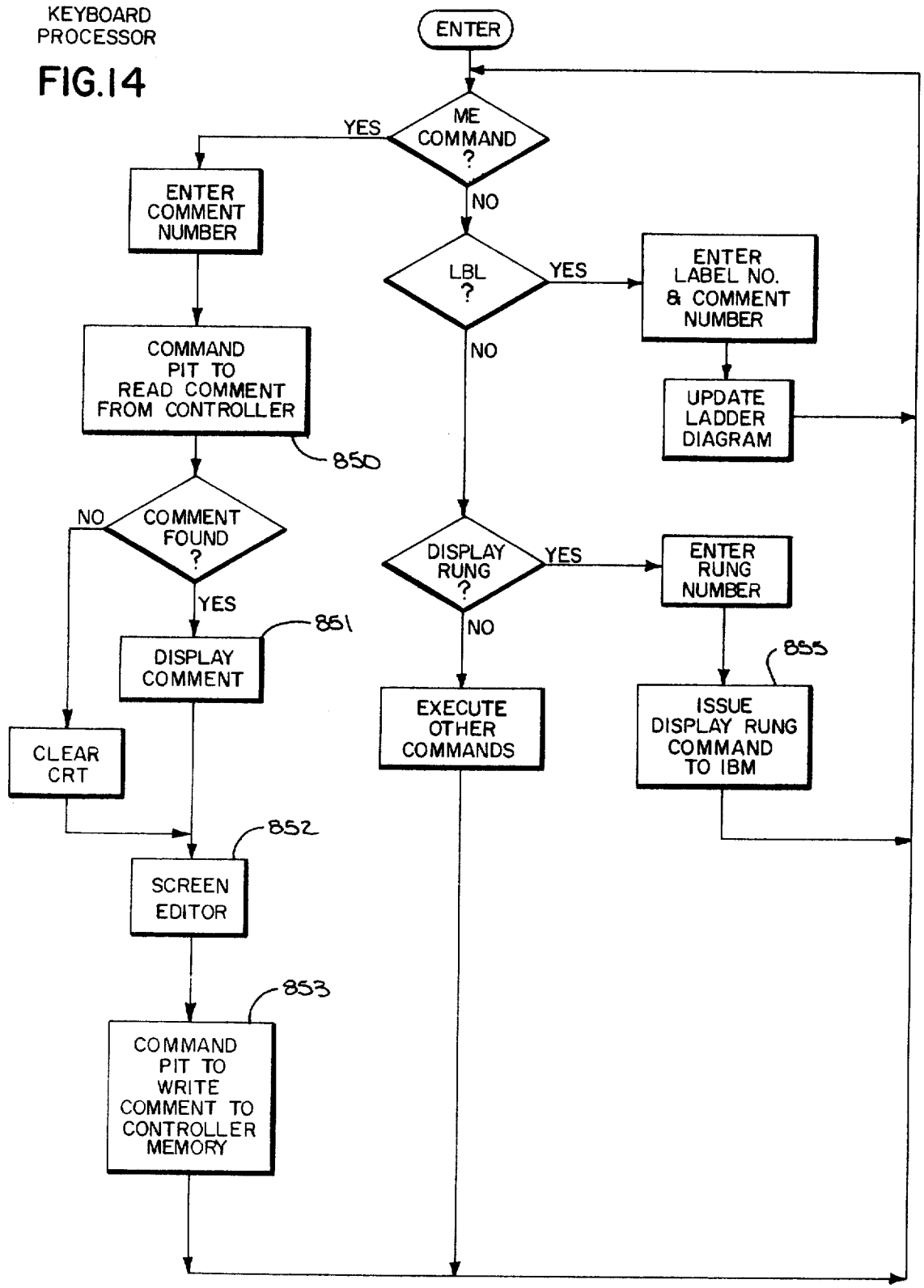

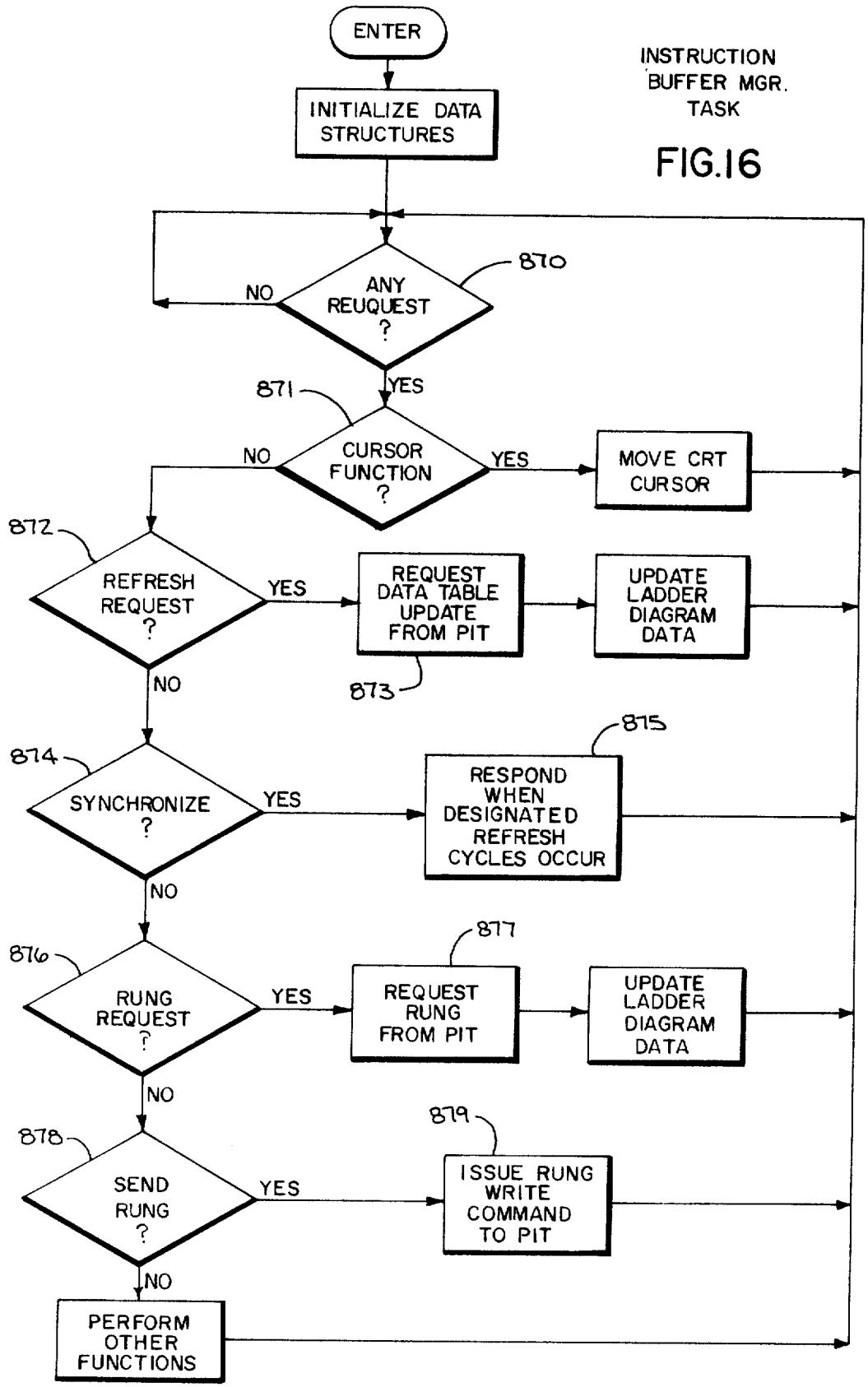

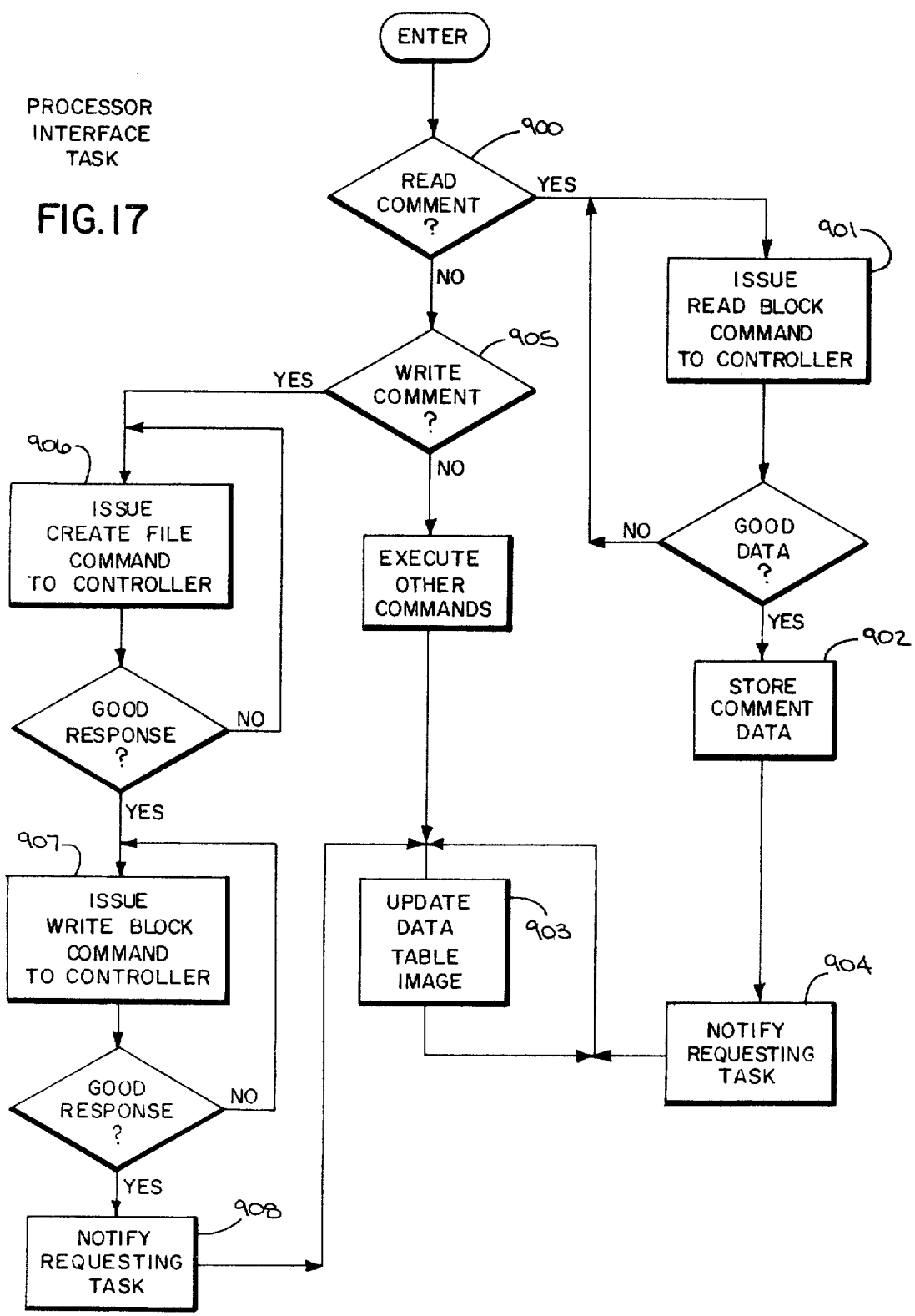
FIG.17 PROCESSOR INTERFACE TASK

PROGRAMMABLE CONTROLLER WITH CONTROL PROGRAM COMMENTS

BACKGROUND OF THE INVENTION

The field of the invention is programmable controllers such as those described in U.S. Pat. Nos. 3,810,118; 3,942,158; and 4,165,534 and copending U.S. Pat. No. 4,442,504 entitled "Modular Programmable Controller."

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices.

The processor in a programmable controller is designed to rapidly execute programmable controller type instructions which call for the manipulation of single-bit input data and the control of single-bit output data. Such instructions have become quite standardized in the industry in terms of the functions they perform. They may be directly associated with elements of a ladder diagram and are, therefore, easily understood by control engineers who use programmable controllers. Program panels such as those disclosed in U.S. Pat. Nos. 3,798,612 and 3,813,649 and in U.S. Pat. No. 4,070,702 have been developed to assist the user in developing and editing control programs comprised of programmable controller type instructions.

Program loaders typically include an alpha-numeric keyboard and a cathode ray tube (CRT) display. By depressing keys on the keyboard, the user creates a control program which is stored in the programmable controller memory as a series of instructions and which is displayed on the CRT as elements in a ladder diagram. The CRT thus provides a graphic representation of the control functions performed by the stored control program.

Although the ladder diagram format is a very graphic technique for displaying the functions performed by the stored control program, it has its limitations. This is particularly the case with programmable controllers having expanded instruction sets that contain higher level instructions which do not have equivalent ladder diagram elements.

SUMMARY OF THE INVENTION

The present invention relates to a programmable controller and its associated program terminal, and particularly, to a system for inserting comment data into the control program which may be displayed by the program terminal to assist the human operator in understanding the functions being performed by the control program. The program terminal includes circuitry for inserting a COMMENT instruction into the control program, circuitry for storing comment data, and circuitry for storing operand data with the COMMENT instruction which indicates the location of the stored comment data. The programmable controller is operable to ignore the COMMENT instruction when it executes the control program, but the program terminal is operable in response to the COMMENT instruction to read the associated comment data and display it for the operator in conjunction with the ladder diagram representation of the control program.

A general object of the invention is to enhance the display format for programmable controller programs. When developing the control program, comments can be entered by the operator to assist in the understanding of the functions being performed. Such comments do not affect the operation of the programmable controller as it executes the control program, but the program terminal sees the comment data and displays it for the operator.

Another object of the invention is to provide a program terminal which enables comments related to specific portions of the control program to be entered, edited and displayed. A COMMENT instruction in the form of an LBL mnemonic and a comment number may be inserted into the control program at the point where comment information is desired. The comment data is entered with a "ME" command to the program terminal followed by the same comment number. A screen editor than enables the comment data to be entered, edited and stored for later use. When the control program is subsequently displayed in ladder diagram form, the comment data is displayed along with the rung containing the LBL instruction.

The foregoing and other objects and advantages of the present invention will become apparent from the following description of the preferred embodiment. Such embodiment does not necessarily represent the full scope of the invention, however, and reference is made to the claims for interpreting the breadth of the invention.

BRIEF DESCRIPTION OF THE DRAWINGS

FIGS. 3A–3D are electrical schematic diagrams of the processor interface circuit which forms part of the circuit of FIG. 2;

FIG. 9 is a timing diagram which illustrates a write cycle and a read cycle on the system backplane bus which forms part of the system of FIG. 1;

FIG. 12 is a block diagram of the functions performed by the programming terminal of FIG. 10;

FIG. 14 is a flow chart of the keyboard processor which forms part of FIG. 12;

FIG. 16 is a flow chart IBM task which forms part of FIG. 12; and

FIG. 17 is a flow chart of the processor interface task which forms part of FIG. 12.

DESCRIPTION OF THE PREFERRED EMBODIMENT

Figure 1:
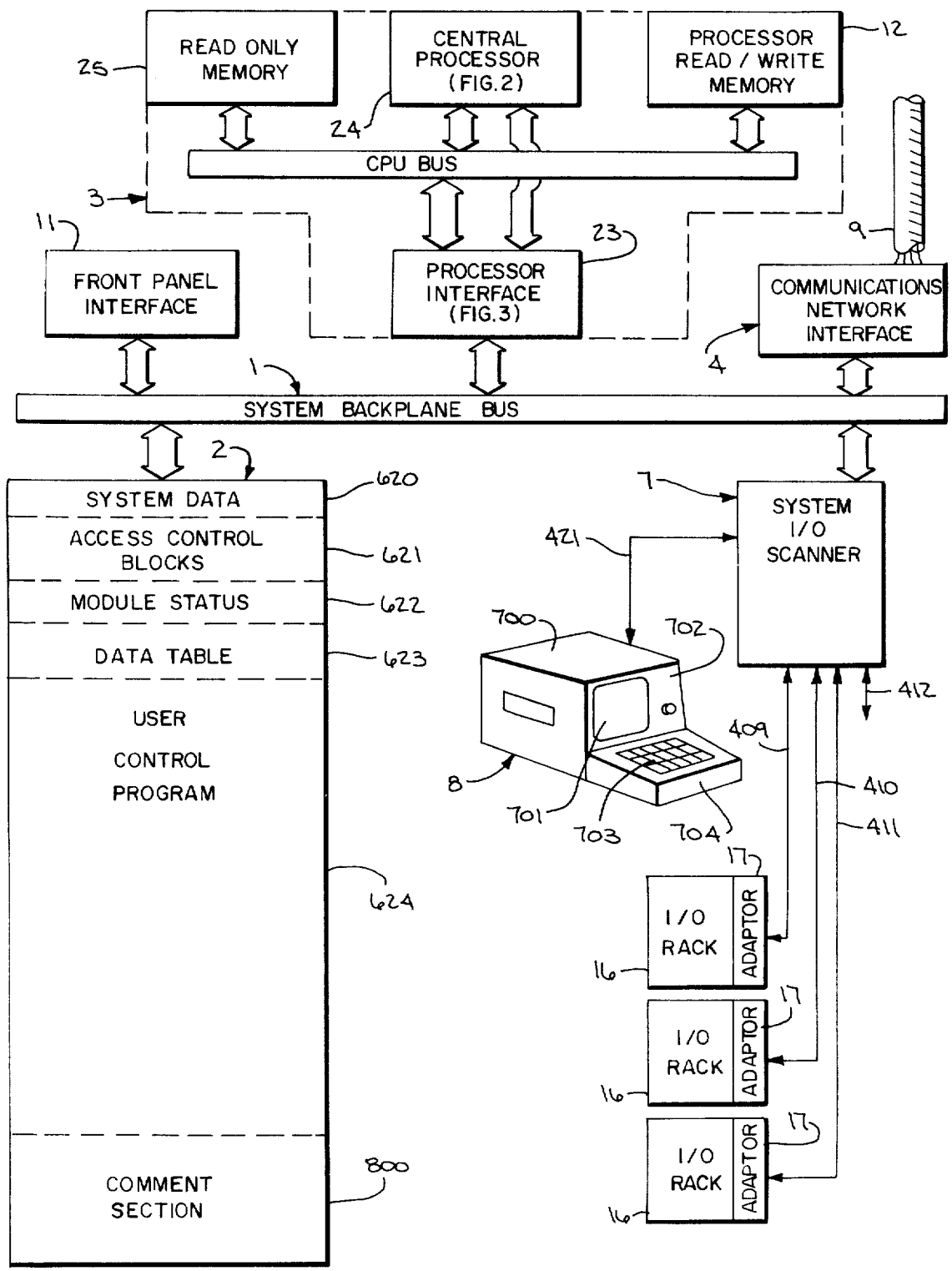
FIG. 1 is a block diagram of the programmable controller of the present invention.

Referring to FIG. 1, the programmable controller includes a number of functionally oriented modules which communicate with each other over a high-performance system backplane bus 1. The system backplane bus 1 includes 16 bidirectional data lines (D0–D15), 26 address lines (A1–A26), and a number of control lines which are employed to signal the transfer of data and to perform bus arbitration and other functions. All of the modules except a memory module 2 are potential masters of the system backplane bus 1 and each can control read and write functions on the bus 1. The backplane bus 1 is physically formed on a motherboard and the various system modules plug into edge connectors which attach to the bus leads and which form "slots" that mechanically support the module circuit boards.

There are a number of different functional modules which may be connected to the system backplane bus 1. These modules need not be present in every system, and indeed, one advantage of this architecture is that the programmable controller can be configured to a particular control function by selection of the proper type and number of modules. In addition, to the memory module 2, the programmable controller described herein includes a CPU module 3, a communications network interface module 4, a system I/O scanner module 7 and a front panel 11. Most of the modules are allocated an address space of 256K and, with the exception of the CPU module 3, all modules may be duplicated in the system.

The memory module 2 contains from 4096 (4K) to 32,768 (32K) words of storage capacity. Each word contains 16-bits of data and one error detection bit. The module 2 occupies one slot in the system backplane bus 1, however, more than one memory module 2 may be used. The memory module 2 stores the user control program which is comprised of a set of macroinstructions that are executed to perform the desired control functions. The macroinstruction set includes conventional programmable controller instructions, arithmetic instructions and logic instructions, as well as many newly-defined instructions which employ the unique architecture of this programmable controller. The macroinstruction set is described in detail in copending U.S. Pat. No. 4,455,601 entitled "Programmable Controller With Multiple Functions."

The user control program is loaded into the memory module 2 and edited using a program panel, or terminal 8 which is shown connected to the system I/O scanner module 7. The terminal 8 includes a keyboard having keys labeled with the proper instruction set mnemonics and a CRT display which presents the control program in rung diagram format.

The communications network interface module 4 connects the programmable controller to a high speed data highway 9 which connects to other programmable controllers and computers in a network. Indeed, it may be a primary function of the programmable controller of the present invention to perform supervisory control operations in a distributed control system. The communications network interface 4 is microprocessor based and it functions to interface the network communication protocol with the system backplane bus protocol. For a detailed description of the communications network protocol and hardware interface, reference is made to U.S. Pat. No. 4,319,338 which issued on Mar. 9, 1982, and is entitled "Industrial Communications Network With Mastership Determined By Need."

The system I/O scanner module 7 is microprocessor-based and it includes four serial ports 409–412 which may be software configured to drive a number of components. In the preferred embodiment shown in FIG. 1, it is configured to communicate with three I/O racks 16 through their respective adapter circuits 17. A fifth serial port 421 on the scanner module 7 communicates with the programming terminal 8.

As will be described in more detail below, the system I/O scanner module 7 includes a random access memory which stores an image of the I/O system input and output points. Changes in the state of input points are received from the I/O racks 16 and the module 7 not only updates the state of its own I/O image, but it also obtains control of the backplane bus 1 and transfers this information to an I/O image and data table 623 in the memory module 2 or to an I/O image table in a processor read/write memory 12 in the CPU module 3. As the CPU module 3 executes the control program stored in the memory module 2, changes are to be made in the state of output points. The system I/O scanner module 7 outputs such state changes to the appropriate I/O rack 16.

The I/O racks 16 may vary in size and contain a variety of separate I/O modules. The I/O modules in each rack 16 contain circuitry which connects the programmable controller to the machine being controlled. These include input circuits such as those disclosed in U.S. Pat. Nos. 3,643,115 and 4,275,307 which sense the opening and closing of switches. This circuitry also includes output circuits such as that disclosed in U.S. Pat. No. 3,745,546 which may be employed to control motors and solenoids. Although a vast majority of these modules are single-bit oriented, word oriented modules such as analog-to-digital and digital-to-analog converter modules disclosed in U.S. Pat. No. 4,104,731 may also be employed. Physically, the I/O racks 16 may take a number of forms as disclosed in U.S. Pat. Nos. 3,992,654; 4,151,580 and 4,152,750.

The front panel module 11 provides a convenient, but rather limited means for manually entering data into the system and for displaying data and diagnostic information. It is microprocessor-based and is operable to receive commands through a keyboard and process the commands to configure the system and control its mode of operation. The contents of selected lines of the I/O image and data table memory 12 can also be displayed and changed. The module 11 is mounted on the door of the processor housing and is connected to the system I/O scanner module 7 through the system backplane bus 1 and a ribbon cable.

MEMORY MODULE

As indicated above, one or more memory modules 2 may be connected to the system backplane bus 1 and any other module in the programmable controller may read or write to these memory modules. In addition to storing one or more control programs, the memory module 2 stores considerable data which relates to the status and operation of each module in the programmable controller system. These data structures serve to coordinate the operation of the various system modules.

Referring particularly to FIG. 1, the memory module 2 includes a system data section 620, an access control block section 621, a module status section 622, and the data table section 623. The system data section 620 occupies twenty-one words of memory and is divided into fields that are dedicated to specific functions. The access control block section 621 is comprised of a set of data blocks, each associated with a particular system module or section of the memory module 2. Each such block of data occupies five lines of memory and is divided into fields which are dedicated to specific functions. The module status section 622 of the memory module 2 is comprised of blocks of data which each contain information concerning the status of specific system modules. The data table section 623 is comprised of sixteen sections, each of which is dedicated to store a specific type of data. One of those sections is the I/O image table discussed above. For a more detailed description of these data structures and the functions they perform, reference is made to the above-cited copending patent application.

The major portion of the memory module 2 stores the user's control program 624. The control program 624 is comprised of macroinstructions which are input by the user from the programming terminal 8. As will be described in more detail below, the programming terminal 8 operates in combination with the system I/O scanner module 7 and the CPU module 3 to write macroinstructions into the control program 624 and edit them to perform the desired control functions. The macroinstruction set which may be employed to form the control program 624 is listed in Table A.

TABLE A

| MACROINSTRUCTION SET | |
|---|---|
| 1. Rung Control Instructions | |
| STRT | Transparent "start of rung" instruction which includes a program counter offset to the first conditional or branch output instruction in the rung. It sets the condition of the rung to the state of the master control relay (MCR) and it provides the information needed to skip instructions that need not be executed. |
| STMC | Same as STRT, but it sets the rung condition true irrespective of the MCR or ZCL state. |
| BST | Defines the start of a branch in a rung and includes a program counter offset to the next NXB instruction to allow skipping of instructions in a false branch. |
| NXB | Defines the start of another branch and includes a program counter offset to the next NXB or BND instruction to allow skipping of instructions in a false branch. |
| BND | Defines the end of one or more branches and checks to determine if any of the branches are true. If not, it includes the program counter offset to the output instruction to enable skipping of unnecessary instructions. |
| STOB | Defines the start of output branches each containing an output instruction. It contains the program counter offset to the first output instruction to enable skipping of further test instructions when the rung or output branch tests false. |
| NXOB | Defines start of additional output branches and contains the program counter offset to the output instruction in the branch it defines. |
| 2. Program Control Instructions | |
| MCR | Defines a master control relay that is included as an output instruction in a rung. When set false, all rungs which follow are set false by STRT instructions, thus enabling the MCR to control entire blocks of output devices. Rungs which start with an STMC instruction are not affected by the state of the MCR. |
| LBL | Creates a table containing the absolute memory address of targets for JMP and JSR instructions. See U. S. Pat. No. 4,115,853. It also indicates a COMMENT instruction when bit 7 = 1. |
| JMP | A conditional jump to its corresponding LBL instruction. The jump is made if the rung in which it appears is true. |
| JSR | A call to a subroutine identified by the corresponding LBL instruction. The return program counter value is saved and the call occurs only if the rung containing the JSR instruction is true. |
| RET | Signals the end of a subroutine and returns to the instruction following the JSR instruction which called the subroutine. |
| ZCL | Defines the start and end of a block of instructions which are to be skipped when the rung containing the first ZCL instruction is false. |
| HALT | Unconditional emergency stop of the programmable controller processor with a fault indication. |
| END | Unconditional end of program which resets the watchdog timer and restarts the execution of the control program at its beginning. The END instruction also defines the set time of the watchdog timer enabling the user to control the maximum allowable scan time. |
| 3. Test Bit Instructions | |
| XIC XOE | Test the status of a bit in the I/O image table. The rung condition remains true if the bit is on (1) and is set false if the bit is off (O). The instruction includes the address of the I/O image Table word and a bit pointer which identifies the particular bit in that word. |
| XIO XOD | Same as XIC and XOE except rung condition is set false when the tested bit is on (1) and remains unchanged when the bit is off (O). |
| 4. Control Bit Instructions | |
| OTE | If the rung condition is true and the master control relay (MCR) is inactive this instruction sets an indicated bit in the I/O image table on (1). Otherwise, the bit is set off (O). |
| OTL | Same as OTE except that the indicated bit is not set off (O), but is instead left unchanged. |
| OTU | If the rung condition is true and the master control relay (MCR) is inactive, this instruction resets a bit in the I/O image table to off (O). Otherwise, no action occurs. |
| 5. Timer/Counter Instructions | |
| CTU | If the rung condition becomes true and the master control relay (MCR) is inactive, the indicated counter is incremented one count. |
| CTD | Same as CTU but the indicated counter is decremented one count. |
| RTO | This retentive timer instruction sets a "done bit" to on (1) at a preset time interval after the rung condition becomes true. If the rung condition becomes false during the time interval, timing stops but the accumulated time is retained. |
| RES | This instruction resets the accumulated count in an indicated counter or it resets the accumulated time in a retentive timer. |
| TON | This timer instruction sets a "done bit" to on (1) at a preset time interval after the |

TABLE A-continued
MACROINSTRUCTION SET

| | |
|---|---|
| | rung condition becomes true. If the rung condition becomes false the done bit is reset to off (O) and the accumulated time is reset. |
| TOF | This timer instruction resets a "done bit" to off (O) at a preset time interval after the rung condition becomes false. If the rung condition becomes true, the done bit is set to on (1) and the accumulated time is reset. |
| 6. Arithmetic and Logical Instructions | |
| ADD | This instruction adds two source operands together and stores the sum in the indicated destination. The appropriate status register bits (result zero, carry, overflow and sign) are set. |
| SUB | This instruction subtracts the second source operand from the first source operand and stores the difference in the indicated destination. The appropriate status register bits are set. |
| MULT | This instruction multiplies the two source operands together and stores the product in the indicated destination. The appropriate status register bits are set. |
| DIV | This instruction divides the first source operand by the second source operand and stores the quotient at the indicated destination. The appropriate status register bits are set. |
| NEG | This instruction subtracts the first source operand from zero and stores the result in the indicated destination. The appropriate status register bits are set. |
| SQRT | This instruction takes the square root of the first source operand and stores the result at the indicated destination. The appropriate status register bits are set. |
| MOVE | This instruction moves the data at the first source operand to the indicated destination and sets the appropriate status register bits. Data is automatically converted when the source and destination are different data type sections of the data table 62J. |
| CMP | This instruction subtracts the second source operand from the first source operand and sets the rung condition false if the comparison fails. The particular comparison to be made is indicated by the destination operand and includes: Equal, Not Equal, Greater Than, Less Than, Greater Than Or Equal To, Less Than Or Equal To |
| LIMIT TEST | This instruction sets the rung condition false if the first source operand is not between the second source operand and the destination operand. |
| AND | This instruction performs a logical AND on each bit of the first source operand with the corresponding bits of the second source operand. The results are stored in the destination operand and the appropriate status register bits are set. |
| OR | Same as the AND instruction except a logical OR is performed on each bit. |
| XOR | Same as the AND instruction except an exclusive OR function is performed on each bit. |
| NOT | This instruction takes the complement of each bit in the first source operand and stores the result in the destination. The appropriate status register bits are set. |

CPU MODULE

Figure 2:
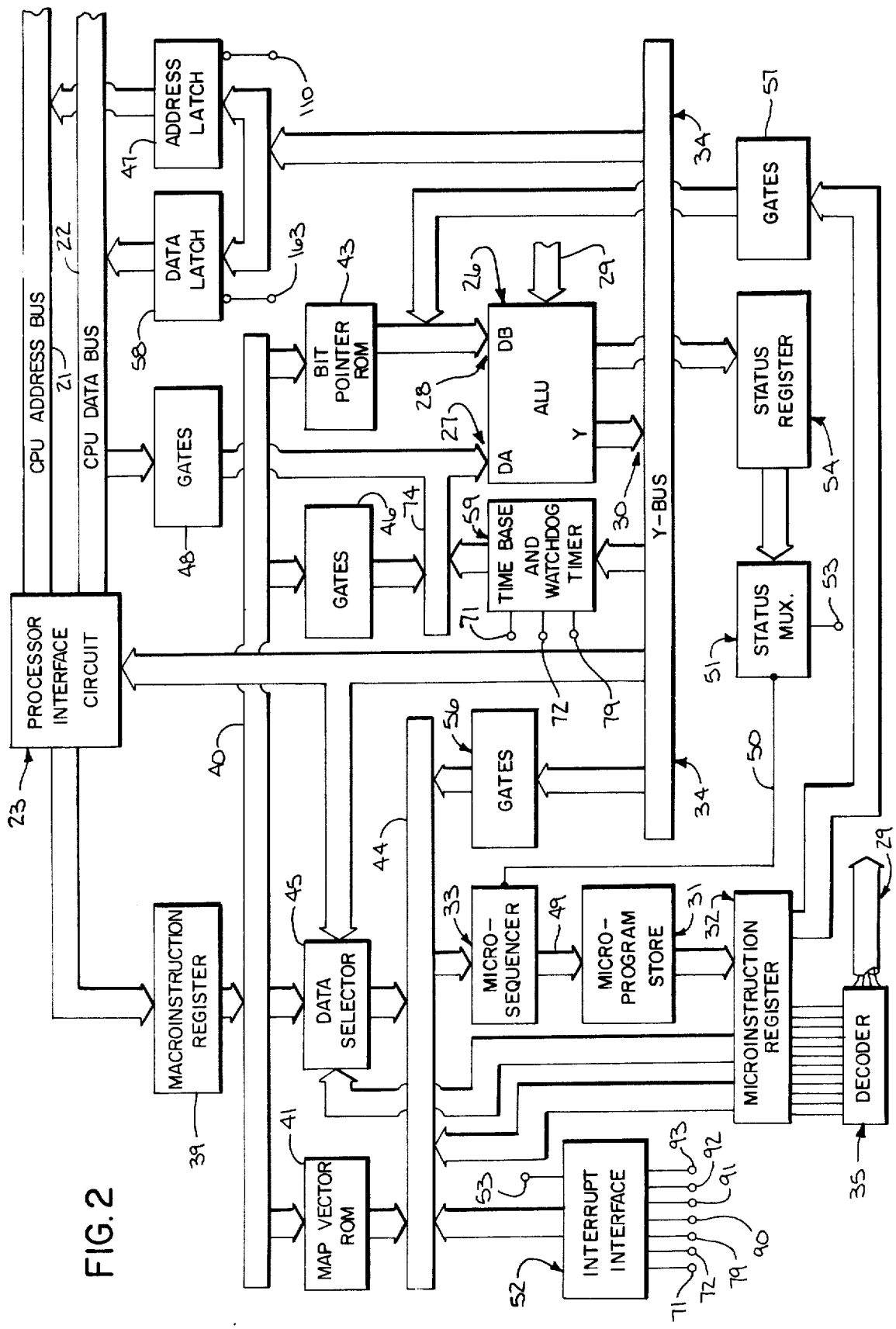
FIG. 2 is a block diagram of the CPU module which forms part of FIG. 1.

Referring particularly to FIGS. 1 and 2, the CPU module 3 is structured around a CPU bus 20 which includes a 16-lead CPU address bus 21 and a 16-lead bi-directional CPU data bus 22. These are coupled to the system backplane bus 1 by a processor interface circuit 23 and they connect to a central processor 24, a read-only memory 25 and the I/O image and data table memory 12. The read-only memory 25 is an 8K × 16-bit high-speed EPROM which stores power-up and housekeeping programs, masks, and other constants. This data is read onto the CPU data bus 22 either in response to microinstructions executed by the central processor 24 or in response to a read operation initiated by one of the modules connected to the system backplane bus 1. In the latter case, the data is coupled through the processor interface circuit 23 and backplane bus 1 to the requesting module.

The I/O image and data table memory 12 is a high-speed random access memory organized as 4K × 16-bit words. This memory 12 stores an image of the most often accessed portion of the I/O image table. The central processor 24 accesses the memory 12 to determine the status of system inputs, and the central processor 24 modifies the contents of the memory 12 to effect changes in system outputs. The remainder of the I/O image table is stored in the data table portion 623 of the memory module 2, and the central processor 24 accesses this data as well. The CPU module 3 couples data which indicates "changes" made in the I/O image table through its processor interface circuit 23 to the corresponding I/O image table in the I/O scanner module 7. The memory 12 also stores data associated with the execution of certain macroinstructions, and in general, it provides storage for data which is to be accessed at high speed.

Referring particularly to FIG. 2, the central processor 24 is a 16-bit, microprogrammed processor which fetches macroinstructions (user control program instructions) from the memory module 2, and decodes each into one or more microinstructions which perform the required operations. The processing of a macroinstruction may also require further access to the memory module 2 or the RAM memory 12 for operands or other required data.

The central processor 24 is structured about an arithmetic and logic unit, ALU 26, which is comprised of four cascaded 4-bit bipolar microprocessor slices (AM2903) manufactured by Advanced Micro Devices, Inc. The ALU 26 includes sixteen internal registers (Reg 0-15) and it receives 16-bit data input words at a DA port 27 or a DB port 28. The ALU 26 performs a number of arithmetic and logic functions in response to signals on a control bus 29 and 16-bit data output words are generated at a Y port 30. For a detailed description of the ALU 26 reference is made to "The AM2900 Family Data Book" published in 1979 by Advanced Micro Devices, Inc.

The operation of not only the ALU 26, but also the remaining elements of the central processor 24 is controlled by 56-bit microinstructions which are sequentially read from a microprogram store 31 to a microinstruction register 32. The 56-bit microinstructions which control the operation of the central processor 24 are divided into micro fields. Each micro field is a code of one or more bits in length which is decoded to provide control signals to specific elements of the central processor 24. For example, the micro field formed by bits 0-3 of each microinstruction operate a microsequencer 33 to control the order in which microinstructions are read from the microprogram store 31. The micro field formed by bits 12-15 on the other hand, control the arithmetic and logic functions performed by the ALU 26 and the micro field formed by bits 28-31 control the various latches and gates which attach to the ALU Y-port 30 through a 16-bit Y-bus 34. Some of the microinstruction bit lines are attached directly to the elements which they control while orders are combined and decoded to provide control signals for various system elements. This decoding circuitry is shown collectively in FIG. 2 as reference number 35 and the resulting control lines form the control bus 29.

Referring particularly to FIG. 2, the macroinstructions from the user control program are read into the central processor 24 through the processor interface circuit 23 and stored in a 16-bit macroinstruction register 39. The macroinstruction register 39 retains the macroinstruction word for reference during the execution of the resulting microroutine. A 10-bit operation code in the macroinstruction is applied through a macro-bus 40 to the address inputs of a map/vector ROM 41, and a 4-bit pointer code is applied to the address inputs of a bit pointer ROM 43. The operation code is converted by the ROM 41 to a twelve-bit microaddress which is applied to a microbranch address bus 44. This decoded operation code is employed to address a microroutine which is then executed to perform the functions indicated by the operation code. The four least significant bits of the macroinstruction may also directly drive the four least significant bit leads in the 12-bit microbranch address bus 44 through a data selector 45. The data selector 45 is enabled when special 16-way microbranch instructions are executed that require four bits from the macroinstruction.

In the present invention one such macroinstruction is a COMMENT instruction. Since the COMMENT instruction does not require any action by the programmer controller a no-operation is performed by the central processor 24. This is achieved by mapping the operation code of the COMMENT macroinstruction to a FETCH microroutine which is stored in the microprogram store 31. The FETCH microroutine merely fetches the next control program instruction for execution and thus the COMMENT instruction is effectively ignored by the central processor 24 when it is operating in the RUN mode.

The microsequencer 33 is an address sequencer for controlling the sequence of execution of microinstructions stored in the microprogram store 31. During the execution of each microinstruction, the microsequencer 33 provides a 12-bit address on a bus 49 to the microprogram store 31. This address selects one of 4096 microinstructions to be executed next. The address generated by the microsequencer 33 may originate from one of four sources within the microsequencer 33: (1) a microprogram address register, which usually contains an address one greater than the previous address; (2) an external direct input from the microbranch address bus 44; (3) a register/counter retaining data loaded during a previous microinstruction; or (4) a five-deep last-in, first-out stack register which provides return address linkage when executing microsubroutines or loops. The microsequencer 33 is responsive to microinstruction bits 0-3 to perform one of sixteen operations, nine of which are conditioned by a signal on a control line 50. That is, an operation such as a jump is performed only if the control line 50 is at a logic low voltage. The microsequencer 33 is available in integrated circuit form as the AM2910, and for a more complete description of its structure and operation, reference is made to "The AM2900 Family Data Book With Related Support Circuits" published in 1979 by Advanced Micro Devices, Inc.

The control line 50 is driven by a status multiplexer 51 which is controlled by bits 40-43 in each microinstruction. The status multiplexer 51 receives a status signal from an interrupt interface circuit 52 through a control line 53 and it receives status signals from a 4-bit status register 54. The inputs of the status register 54 are driven by the "carry", "overflow", "zero" and "sign" status outputs of the ALU 26. The operation of the microsequencer 33 can thus be conditioned by the status of the ALU 26 or by the existence of an interrupt request from the interrupt interface circuit 52.

Referring still to FIG. 2, a microprogram address may be supplied to the microsequencer 33 through the bus 44 from a number of sources. For example, when a macroinstruction is fetched its operation code is applied to the map/vector ROM 41, and it is converted, or mapped, to a 12-bit microprogram address which is generated on the bus 44. In this manner, each macroinstruction is mapped to its corresponding microroutine. Also, when a jump microinstruction is executed, bits 44-45 of the microinstruction are coupled directly to the bus 44 from the microinstruction register 32. This "target address" identifies the point in the microprogram at which processing is to continue. In addition, a 12-bit microaddress may be coupled from the Y port 30 of the ALU 26 through a set of gates 56. This allows, for example, the target address of a microjump to be calculated by the ALU 26. And finally, microaddress data may be coupled to the microsequencer 33 from a data selector 45 and an interrupt interface 52.

Referring to FIG. 2, the central processor 24 includes other elements which enable it to perform a wide variety of functions. Gates 46 couple data from the bus 40 to the ALU 26, and when enabled for example, they allow the 9-bit operand address which accompanies a bit pointer code to be coupled through the ALU 26 to an address latch 47 and then to the CPU address bus 21. Gates 48 on the other hand, connect the CPU data bus 22 to the DA port 27 on the ALU 26. This enables a 16-bit data word from either the processor interface circuit 23, the I/O image and data table memory 12 or the read-only memory 25 to be applied through the gates 48 directly to the ALU 26. In addition, bits 40-55 of the microinstruction register 32 are coupled to a set of sixteen gates 57 and the outputs of gates 57 are connected to the DB port 28 on the ALU 26. A sixteen bit data word can thus be applied to the ALU 26 "immediately" by a microinstruction. Such a data word might be, for example, a mask which is logically combined with a data word applied to the ALU DA port 27. Also, the output of the ALU 26 may be coupled through the Y-bus 34 to a 16-bit data latch 58, the address latch 47 or the processor interface circuit 23. The data latch 58 connects to the CPU data bus 22 and the output of the ALU 26 can thus be written into the I/O image and data table memory 12. And finally, the ALU Y-bus 34 connects to the input of a time base and watchdog timer circuit 59. As will now be described in more detail, the output of this circuit 59 also connects to the ALU DA input port 27.

Figure 4:
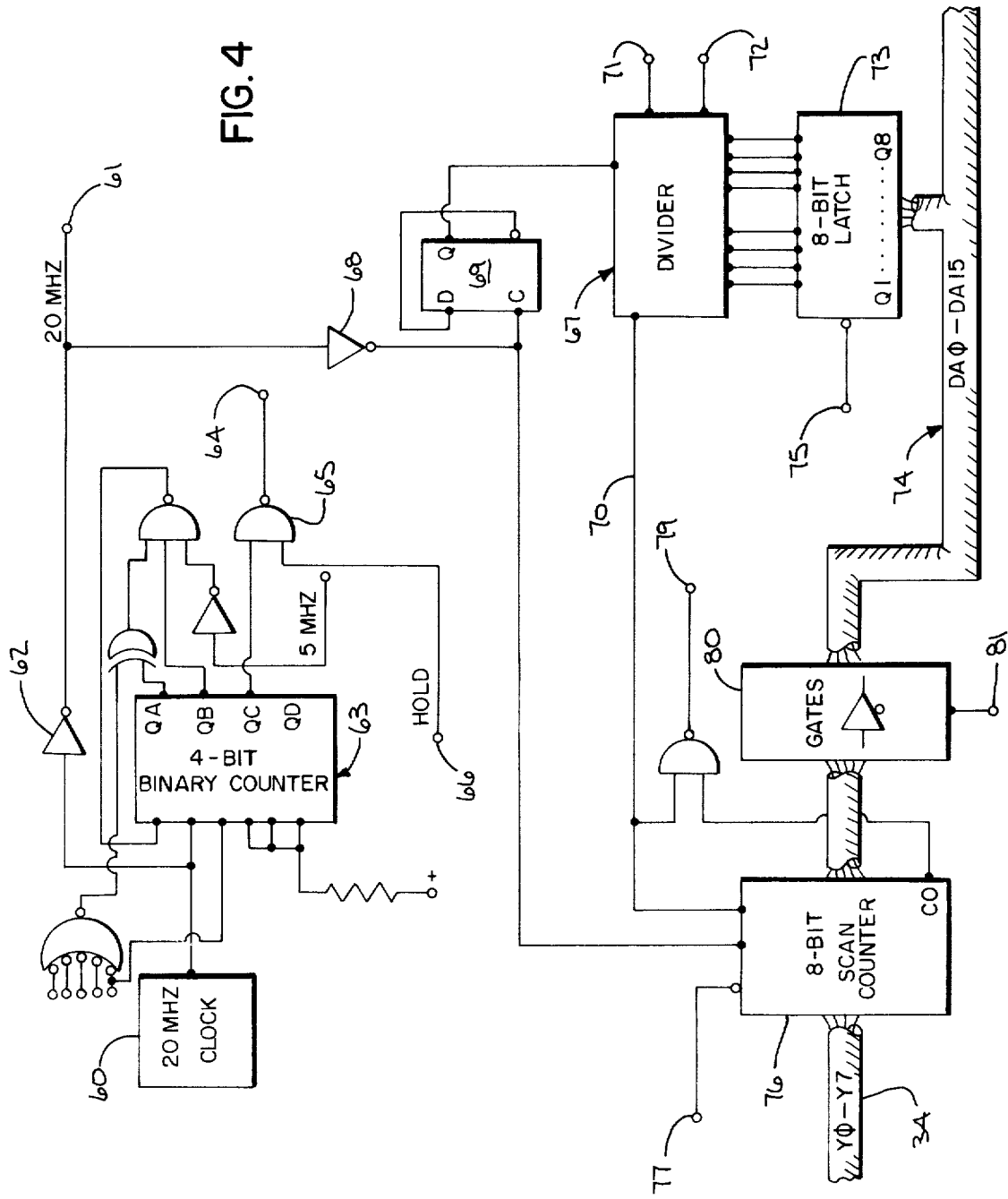
FIG. 4 is an electrical schematic diagram of the time base and watchdog timer which forms part of the circuit of FIG. 2.

Referring particularly to FIGS. 2 and 4, the time base and watchdog timer circuit provides the system clock signals and the real time clock signals employed in timer macroinstructions and the real time interrupt process. It includes a 20 megahertz single phase clock 60 which drives a clock line 61 through a driver 62. The 20 megahertz clock 60 also drives a 4-bit binary counter 63 which generates a system clock signal on a line 64. The system clock provides a time base of 200, 250 or 300 nanoseconds depending on the type of instruction being executed. The system clock can be inhibited, by a NAND gate 65 which is responsive to a HOLD signal on a control line 66.

The 20 megahertz clock also drives a divider circuit 67 through an inverter 68 and a D-type flip-flop 69. The divider 67 is comprised of a series of dividers and counters which reduce the clock rate to values that provide the desired time bases. More specifically, a time base of one millisecond is generated on a line 70, a time base of 0.01 seconds is generated on a line 71 and a time base of 0.1 seconds is generated on a line 72. In addition, an 8-bit latch 73 connects to the divider 67 to store a 4-bit binary count of the 0.01 second time intervals, a 2-bit binary count of the 0.1 second time intervals and a 2-bit count of 0.5 second intervals. The eight Q outputs on the latch 73 connect to the ALU DA port 27 through bus 74, and when a logic low control signal is received on a line 75, the contents of the latch 73 are read into the ALU 26.

The line 70 increments an 8-bit scan counter 76 which serves as a means for measuring the time required to execute the user's control program. The eight inputs to the scan counter 76 are connected to the eight least significant leads in the Y-bus 34 and it is preset through a control line 77 to the one's compliment of the maximum allowable scan time prior to each pass through the user's control program. As the user's control program is executed, the counter is incremented in ten millisecond time increments until it overflows, or is again preset at the beginning of the next scan. A NAND gate 78 connects to detect an overflow and it generates a logic low voltage on a control line 79 when this event occurs. As will be explained in more detail below, the control line 79 connects to the interrupt interface circuit 52 to initiate an interrupt when the scan counter "times out". In addition, a set of eight tri-state gates 80 connect to the outputs of the scan counter 76, and when a logic low voltage is applied to control line 81, the contents of the counter 76 is read onto the bus 74 and into the ALU 26. In this manner, the time required to execute the control program, or portions of it, can be measured.

Figure 5:
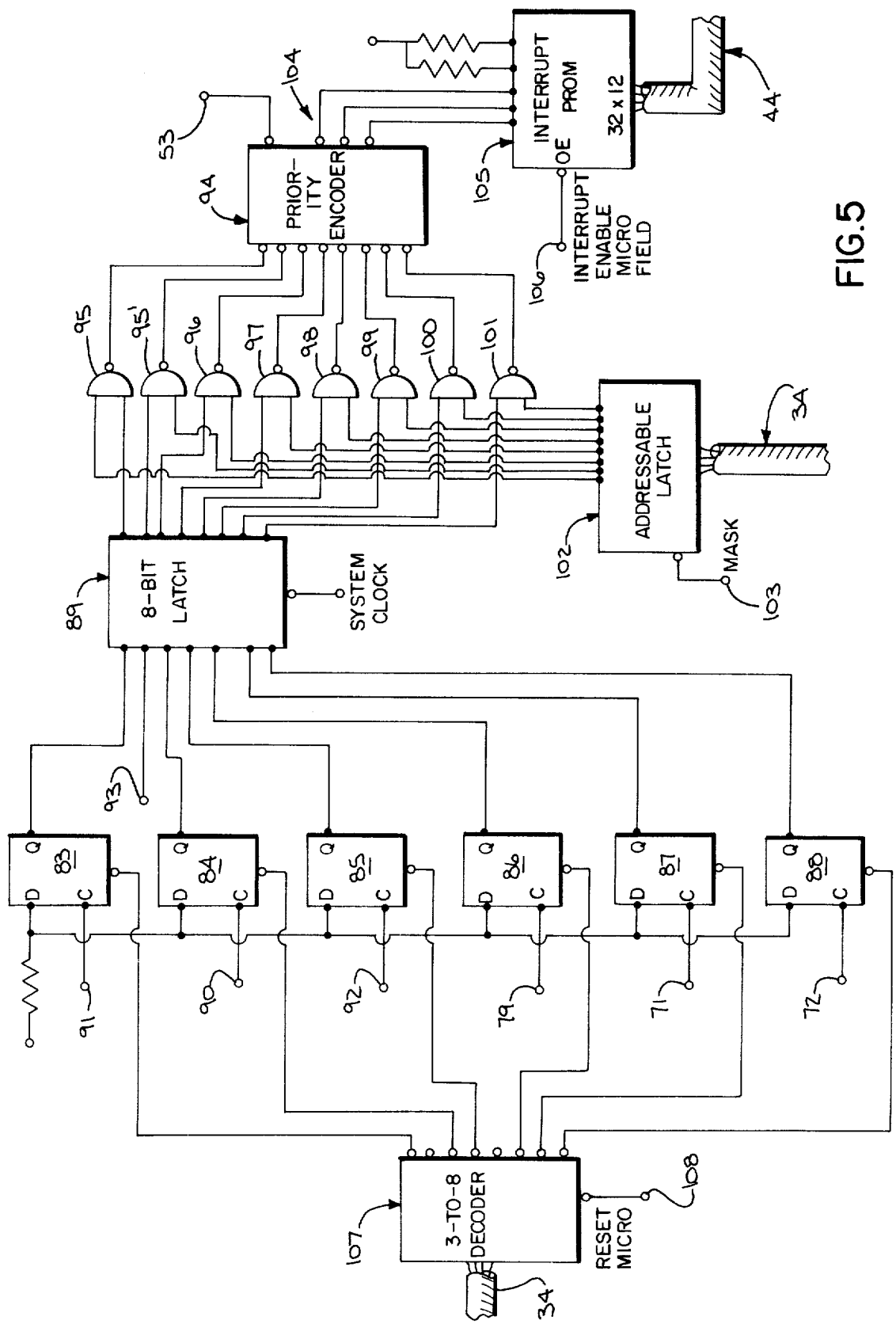
FIG. 5 is an electrical schematic diagram of the interrupt interface circuit which forms part of the circuit of FIG. 2.

Referring particularly to FIGS. 2 and 5, the interrupt interface circuit 52 receives interrupt requests from seven sources, prioritizes them, and generates a code to an interrupt PROM which supplies the starting address on the microbranch address bus 44 of the highest priority service routine. Six of the interrupt requests are received at the clock terminals of respective D-type flip-flops 83-88 and the seventh is applied directly to one input of an 8-bit latch 89. Three of the interrupt requests emanate from the time base and watchdog timer circuit described above to interrupt processing when the allowable scan time has been exceeded or when the 0.01 second real-time clock has "ticked" or when the 0.1 second real-time clock has ticked. A fourth interrupt request emanates from a line 90 in the backplane bus when a module attached thereto requests an interrupt, and a fifth interrupt is requested by line 91 when a.c. power failure is detected. The remaining two interrupts are fault related. The first appears on line 92 when an error is detected during a read or write operation to the system backplane bus 1 and the other appears on line 93 when a fault such as a memory parity error occurs.

Any interrupt requests remain in the respective flip-flops 83-88 until serviced. The Q outputs of flip-flops 83-88 are connected to inputs on the latch 89 and the interrupt requests are latched in synchronism with the 5 MHZ system clock. The eight latch outputs are coupled to a priority encoder 94 through respective NAND gates 95-101.

The NAND gates 95-101 enable interrupt requests to be masked. A second input on each connects to a respective output of an eight-bit addressable latch 102 which has its three latch select inputs and its data input connected to the Y-bus 34. When a control line 103 is driven low, a selected one of the NAND gates 95-101 may be either enabled or disabled (i.e. mask the interrupt) by data which is output from the ALU 26 to the addressable latch 102.

The priority encoder 94 generates a three-bit binary code at its outputs 104 which identifies the highest priority interrupt applied to its eight inputs. A "EO" output on the priority encoder 94 connects to the control line 53 and it is driven high if any interrupts are requested. The outputs 104 connect to the address inputs of the interrupt PROM 105, and the 3-bit code thereon is mapped to the starting address of the corresponding interrupt service microroutine. When the interrupt PROM 105 is enabled by control line 106, this address is applied to the bus 44 and loaded into the microsequencer 33.

After an interrupt has been serviced the request is reset. Referring still to FIG. 5, this is accomplished by a 3-line-to-8-line decoder 107 which has its three inputs connected to leads 0-2 in the Y-bus 34. Six of its outputs are connected to reset terminals on respective flip-flops 83-88, and when enabled by a control line 108, the flip-flop indicated by the 3-bit code on the Y-bus 34 is reset. The interrupt indicated on line 93 requires a manual reset following correction of the indicated fault.

It should be apparent that the interrupt interface circuit 52 may be expanded to enable additional interrupt input events and that the nature of the interrupt events can be easily changed by altering the contents of the interrupt PROM 105.

As indicated above, it is the function of the I/O scanner module 7 to periodically update the state of the I/O image table in the memory 12 and it is a function of the central processor 24 to fetch control instructions (i.e. macroinstructions) from the memory module 2. These functions require bi-directional communications between the central processor 24 and the system backplane bus 1. Also, because a number of asynchronously operating modules are connected to the system backplane bus 1, an arbitration means must be provided to allocate the backplane bus 1 to the requesting system module or the central processor 24 in accordance with a preselected priority scheme.

Figure 3A:
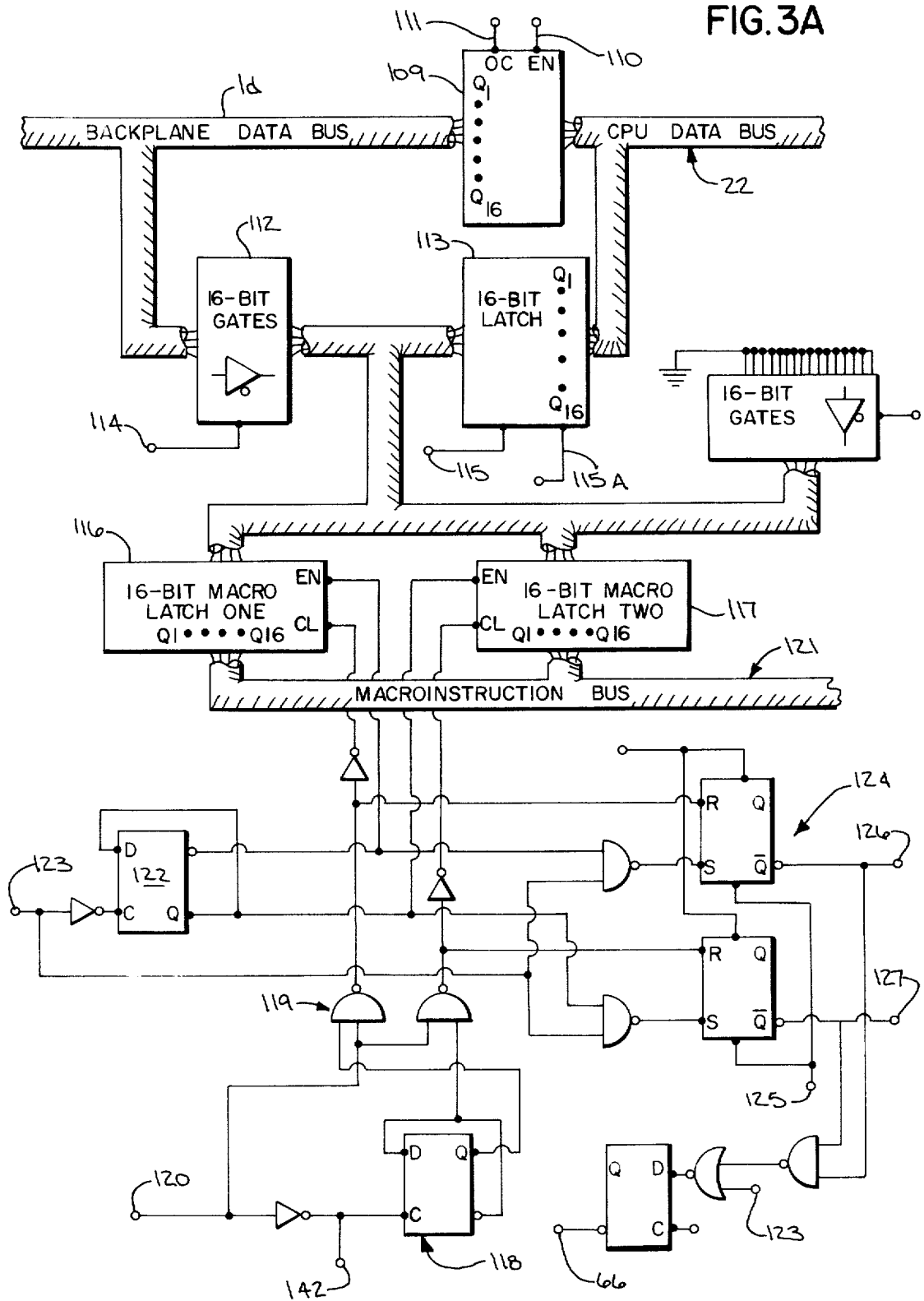

These functions are performed by the processor interface circuit 23. Referring particularly to FIGS. 1, 2 and 3A, the sixteen leads in the CPU data bus 22 are coupled to the sixteen leads in the system backplane bus 1d by a 16-bit latch 109. Data is clocked into the latch 109 from the bus 22 when a control line 110 goes high and this data is applied to the backplane data bus 1d when a control line 111 becomes active. On the other hand, a set of sixteen tri-state gates 112 and a latch 113 couple the backplane data bus 1d to the CPU data bus 22. When enabled by control lines 114 and 115 data from the backplane bus 1 may be coupled through the gates 112 and the latch 113 and written to an addressed destination in the central processor module 24. It is in this manner, for example, that the system I/O bus interface module 6 updates the I/O image and data table memory 12 with changes occurring at input points in the I/O racks 16.

In addition to coupling the respective data buses 1d and 22, the gates 112 also input control program macroinstructions which are fetched from the memory module 2. These macroinstructions are applied to the inputs of a first macro latch 116 and to the inputs of a second macro latch 117. As fetched macroinstructions are received, they are alternately loaded into the respective latches 116 and 117. This enables macroinstructions to be "prefetched" so that the central processor module 24 can operate at maximum speed without waiting for the next macroinstruction. Control of the latches 116 and 117 is accomplished by a flip-flop 118 and a pair of NAND gates 119. The flip-flop 118 serves to alternately clock the latches 116 and 117 and to time the clock pulse such that the macroinstruction is latched properly when received from the memory module 2. As a result, when a macroinstruction is fetched, a control line 120 becomes active and one of the two NAND gates 119 is momentarily gated to clock one of the latches 116 or 117.

The output of the latches 116 and 117 connect to the leads in a macroinstruction bus 121 which connects to the inputs of the macroinstruction register 39. A flip-flop 122 connects to the enable terminals on the respective latches 116 and 117, and the contents of the latches are alternately output to the macroinstruction register 39 in response to signals on control line 123. A set of flip-flops and gates indicated generally at 124 keep track of macroinstructions loaded into and read out of the latches 116 and 117, and if a request is made for another macroinstruction and none is available, an active signal is generated on the control line 66 to disable the central processor clock (see FIG. 4). The central processor is thus held in an idle state until another macroinstruction is received from the memory module 2. Control lines 126 and 127, which also emanate from this circuit, indicate when either of the latches 116 or 117 is empty, and as will be described below, these signals initiate a prefetch of another macroinstruction when either of the macro latches 116 or 117 is empty.

As long as the control program macroinstructions are executed in sequence, the subsequent macroinstructions are prefetched to the macro latches 116 and 117 and are available when needed by the central processor 24. However, when the control program deviates from a straight sequential execution of macroinstructions, as occurs during a jump or branch, the prefetched macroinstructions in the latches 116 and 117 are of no use. When this occurs, a control line 125 is enabled and the flip-flops 124 are reset to indicate that no macroinstructions are available for execution.

Figure 3B:
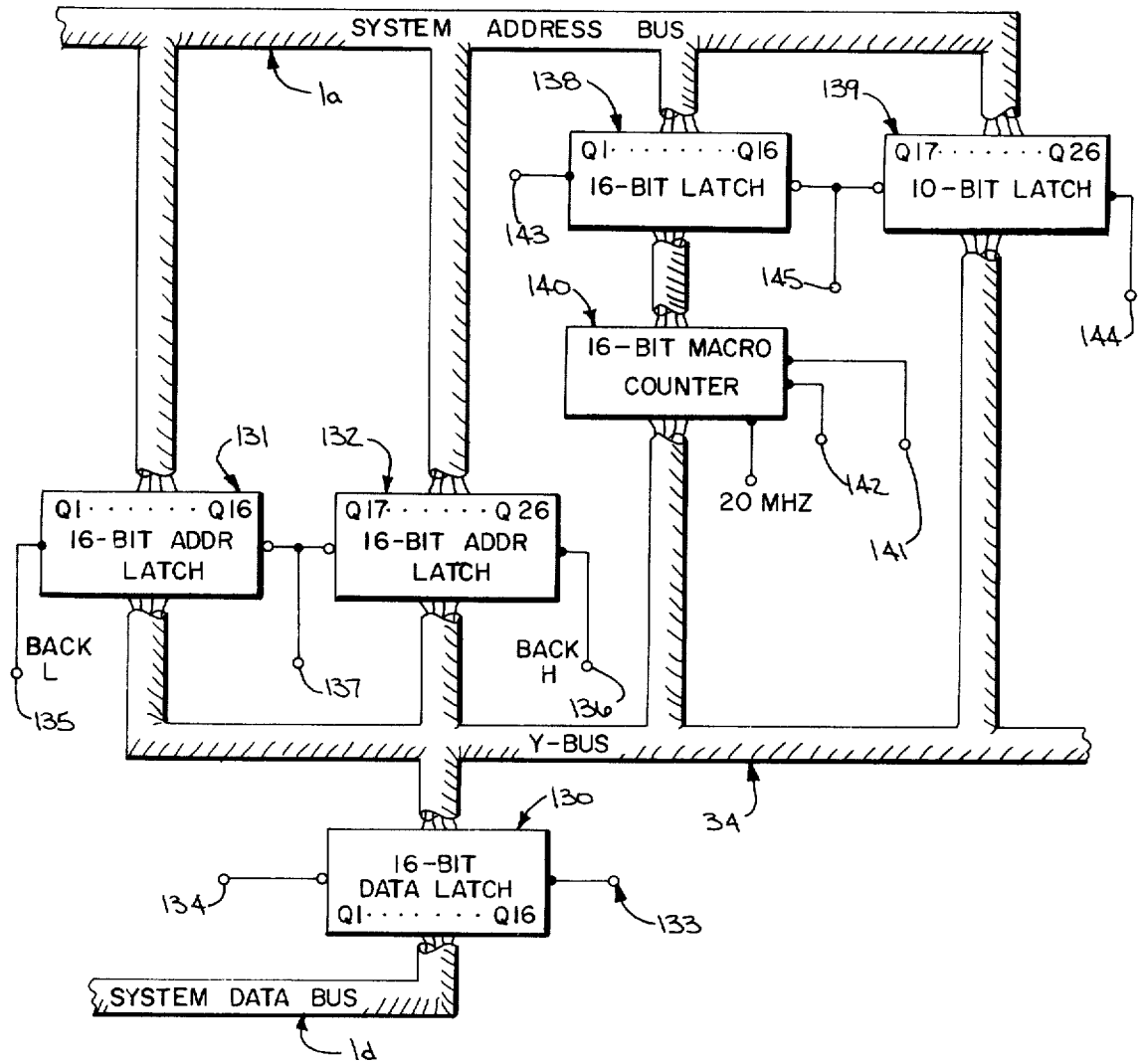

Referring particularly to FIGS. 2 and 3B, the ALU Y-bus 34 is also coupled to the system backplane bus 1 through the processor interface circuit 23. It connects to the system data bus 1d through a 16-bit data latch 130 and it connects to the system address bus 1a through a pair of address latches 131 and 132. The data latch 130 is loaded with data which is output from the ALU 26 when a control line 133 is active and this data is written onto the backplane data bus 1d when a control line 134 is active. Similarly, address data is output to the respective latches 131 and 132 when control lines 135 and 136 are active and this 26-bit address is applied to the backplane address bus 1a when a control line 137 is active. Data and addresses can thus be generated directly by the ALU 26 for application to the backplane bus 1, and hence to other modules in the system.

Control program macroinstructions stored in the memory module 2 are addressed by the CPU module 3 by means of data stored in a 16-bit latch 138 and a 10-bit latch 139. The inputs of the 10-bit latch 139 are connected directly to leads in the Y-bus 34, however, the inputs to the 16-bit latch 138 are driven by a 16-bit "macro" counter 140. The macro counter 140 may be preset to an address generated by the ALU 26 on the Y-bus 34 when a control line 141 is active and the counter 140 is incremented each time a macroinstruction is fetched. This is accomplished by a control line 142 which emanates from the clock terminal of flip-flop 118 (FIG. 3A). The contents of the macro counter 140 are loaded into the latch 138 when control line 143 becomes active, and the 10-bit latch 139 is loaded with high order address data from the Y-bus 34 when the control line 144 becomes active. The resulting 26-bit address is applied to the backplane address bus 1a when the central processor module 24 obtains access to the backplane bus 1 and a control line 145 becomes active.

Referring to FIGS. 2 and 3C, a module connected to the system backplane bus 1 accesses the CPU module 3 by asserting an address within a preselected range on the address bus 1a and asserting the proper signals on the system backplane bus control lines. Ten of the most significant digit leads in the system address bus 1a couple to the "A" inputs of a comparator circuit 150, and when the CPU module 3 is addressed by another module, the comparator 150 generates a logic high voltage at an output 151. A set of module ID switches, or jumpers 152, connect to the "B" inputs of the comparator and these serve as a means for preselecting the CPU access address range.

The module requesting access to the CPU module 3 also asserts a logic low voltage on a backplane control line (XCMD) 153 to indicate that valid data is present on the backplane bus 1. This signal is inverted and applied to the clock terminals on two D-type flip-flops 154 and 155 and to the K terminal on a J-K flip-flop 156. The output of the comparator 150 is thus clocked into the flip-flop 154 and applied to one input of an AND gate 156. A second input 157 on AND gate 156 connects to receive bit 4 from the microinstruction register 32, and if access to the CPU module 3 is to be blocked, it is set low. Otherwise, the output of AND gate 156 is clocked into a second D-type flip-flop 159.

The Q and Q outputs on the second D-type flip-flop 159 enable a number of elements in the CPU module 3. The Q output connects to an enable terminal 160 on a set of sixteen address gates 161 and a sixteen bit address is thus applied to the CPU address bus 21 when access to the CPU module 3 is obtained. The Q output of flip-flop 159 connects directly to control line 110 to disable the address latch 47 (FIG. 2) and to enable the inputs of the latch 109 (FIG. 3A). In addition, this Q output connects through an OR gate 162 to a control line 163 which disables the data latch 58 (FIG. 2) when external access is granted. A second input on the OR gate 162 is driven by a control line 164 which becomes active during a central processor write operation. The Q output on flip-flop 159 also connects to one input of a NAND gate 165. The second input on this NAND gate 165 is driven by a control line 166, and when data is to be read by the CPU module 3, the output of gate 165 is driven low. The output of gate 165 drives a pair of AND gates 167 and 168. The AND gate 167 in turn drives the control line 115 which controls latch 113 (FIG. 3A) and the AND gate 168 drives a CPU WE control line 169. When a module on the system backplane bus 1 writes to the CPU module 3, therefore, the control lines 115 and 169 are driven low.

The J-K flip-flop 156 is set shortly after the flip-flop 159 by the system clock applied to its clock terminal. The Q output on flip-flop 156 connects to an inverter gate 170 that drives a backplane acknowledge (XACK) control line 171. The signal thus generated on the XACK control line 171 indicates to the requesting module that the CPU module 3 has received its request and that valid data is on the system bus 1. The flip-flop 156 also drives a NAND gate 172, and if a read operation is indicated by the backplane read/write line 166, the output of this gate 172 is driven low to enable the outputs of latch 109 (FIG. 3A) through control line 111. The flip-flops 154 and 156 are reset by the backplane control line XCMD 153 and the signal is removed from the XACK control line 171 by the flip-flop 156 to indicate that the data transfer is complete.

Referring to FIGS. 2 and 3C, in addition to reading from or writing to the CPU module 3, an external module may also interrupt the central processor 24 or force it into a "hold" state. An interrupt request is accomplished by writing to a specific address which causes an interrupt request to be generated on a line 90 by a NAND gate 173. One input to this gate 173 is enabled low by the NAND gate 165 when a backplane write operation is indicated, and its other input is enabled low when the preselected interrupt address is present on the CPU address bus 21. A decoder circuit 174 detects not only this interrupt address, but it also decodes other addresses on the bus 21 to generate appropriate chip enable signals to the I/O image and data table memory 12 and the read only memory 25.

An external module may also place the central processor 24 in "hold" by asserting a logic low voltage on a backplane control line (CPU HOLD) 175. This signal is coupled through an inverter gate 176 and AND gate 177 to the D input of the flip-flop 155. The Q output of flip-flop 155 connects to the D input of another D-type flip-flop 178 and the Q output on this flip-flop 178 connects to the hold control line 66 to disable the system clock (FIG. 4). The central processor 24 remains in the hold condition until another backplane command is generated to reset the flip-flops 155 and 178.

Figure 3D:
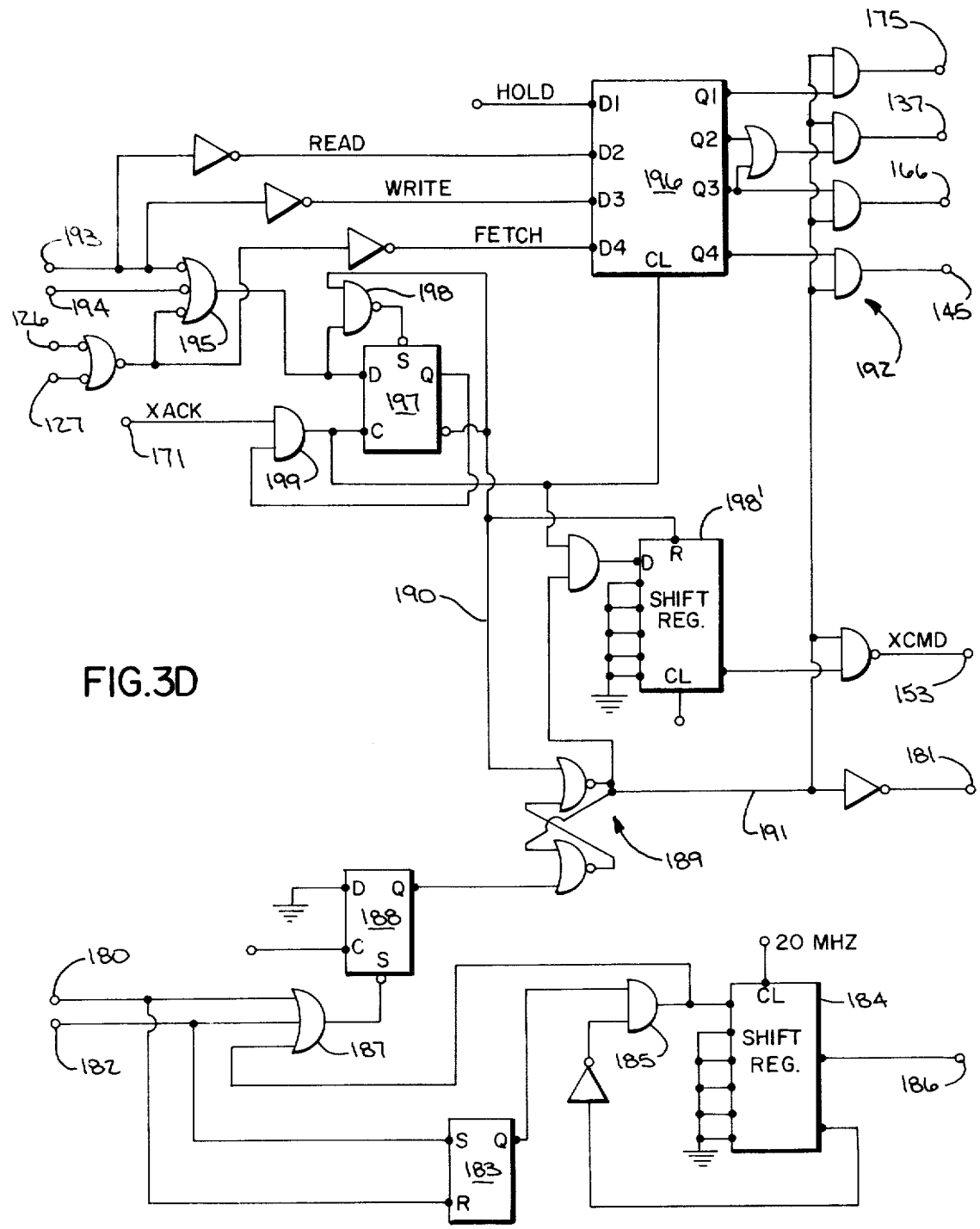

Referring particularly to FIGS. 2, 3D and 9, the central processor 24 contains circuitry for determining which module in the programmable controller may have access to the backplane bus 1. An arbitration request control line 182 connects to each module on the backplane bus 1 and when a module wants access, it asserts an arbitration request logic signal to the arbitration circuit on the central processor 24. This signal sets a flip-flop 183, which in turn applies a logic signal to a shift register 184. The shift register 184 generates a 200 nanosecond arbitration pulse on a backplane control line 186, and as will be described in more detail hereinafter, the requesting module having the highest priority will respond to this pulse by asserting a signal on a WIN control line 180. The successful module will then assert a "bus busy" signal on a backplane control line 181 and initiate a data transfer.

The central processor module 24 may gain access to the backplane bus 1 when no other module in the programmable controller needs it. Referring to FIG. 3D, this condition is sensed by an OR gate 187 which sets a flip-flop 188 when the backplane bus 1 is not requested by another module. The flip-flop 188 drives a pair of NOR gates 189 and when the central processor module 24 wants access, as indicated by the logic state of a WANT control line 190, a logic high enabling signal is generated on an IGOT control line 191. The IGOT control line 191 drives the BUS BUSY control line 181 and it enables a series of AND gates 192 which couple the processor module 24 to the backplane HOLD control line 175, the control line 137 (FIG. 3B), the backplane read/write control line 166 and the control line 145 (FIG. 3B).

The WANT control line 190 is enabled whenever the central processor module 24 requires the backplane bus 1 to perform a read operation, a write operation or a macroinstruction FETCH. A BACK READ control line 193 is enabled when a BACKR microcode is executed and a BACK WRITE control line 194 is enabled when a BACKW microcode is executed. These signals along with the macroinstruction buffer empty signals on lines 126 and 127 are applied to an OR gae 195 and to respective inputs of a quad D-type flip-flop 196. The output of the OR gate 195 drives a D-type flip-flop 197 which is set by a NAND gate 198 when access is desired and the flip-flop 197 generates a logic low signal on WANT control line 190. This logic low voltage releases a shift register 185 from reset and a logic high voltage is generated by the flip-flop 197 to an AND gate 199 to clock the quad flip-flop 196. The contents of the quad flip-flop 196 is gated to the respective control lines 175, 137, 166 and 145 by the AND gates 192, and a short time thereafter, the XCMD backplane control line 153 is activated by the output of the shift register 185 to indicate that valid data is on the system backplane bus 1. When the module with which the central processor module 24 is communicating acknowledges that the data transfer has occurred, the backplane control line XACK 171 rises to a logic high voltage to clock the flip-flop 197 and to thereby either initiate another transfer or reset it.

Referring particularly to FIG. 9, the arbitration process is performed concurrently with the transfer of data between modules. That is, prior to the completion of a read or write cycle on the backplane bus 1, the arbitration process has already occurred and the highest priority module desiring access to the backplane bus 1 has been found and is ready to perform a read or write operation when the bus becomes available. Bus availability is indicated by a logic high on the bus busy control line 181 and shortly thereafter the new "master" module of the backplane bus initiates a read or write cycle. The master module drives the XCMD control line 153 low to indicate that a valid address is on the backplane bus 1 and the addressed "slave" module responds by driving the XACK control line 171 low. The XCMC control line 153 is released by the master module shortly thereafter and the slave module responds by releasing the XACK control line 171 to complete the read or write cycle.

Any module, except the CPU module 3, can request arbitration by driving the control line 182 low. As described previously, this causes an arbitration pulse to be sent to all modules through the control line 186, and the highest priority module will drive the WIN control line 180 low to terminate arbitration. That module will then take control of the backplane bus 1 when the bus busy control line 181 goes high.

Figure 7:
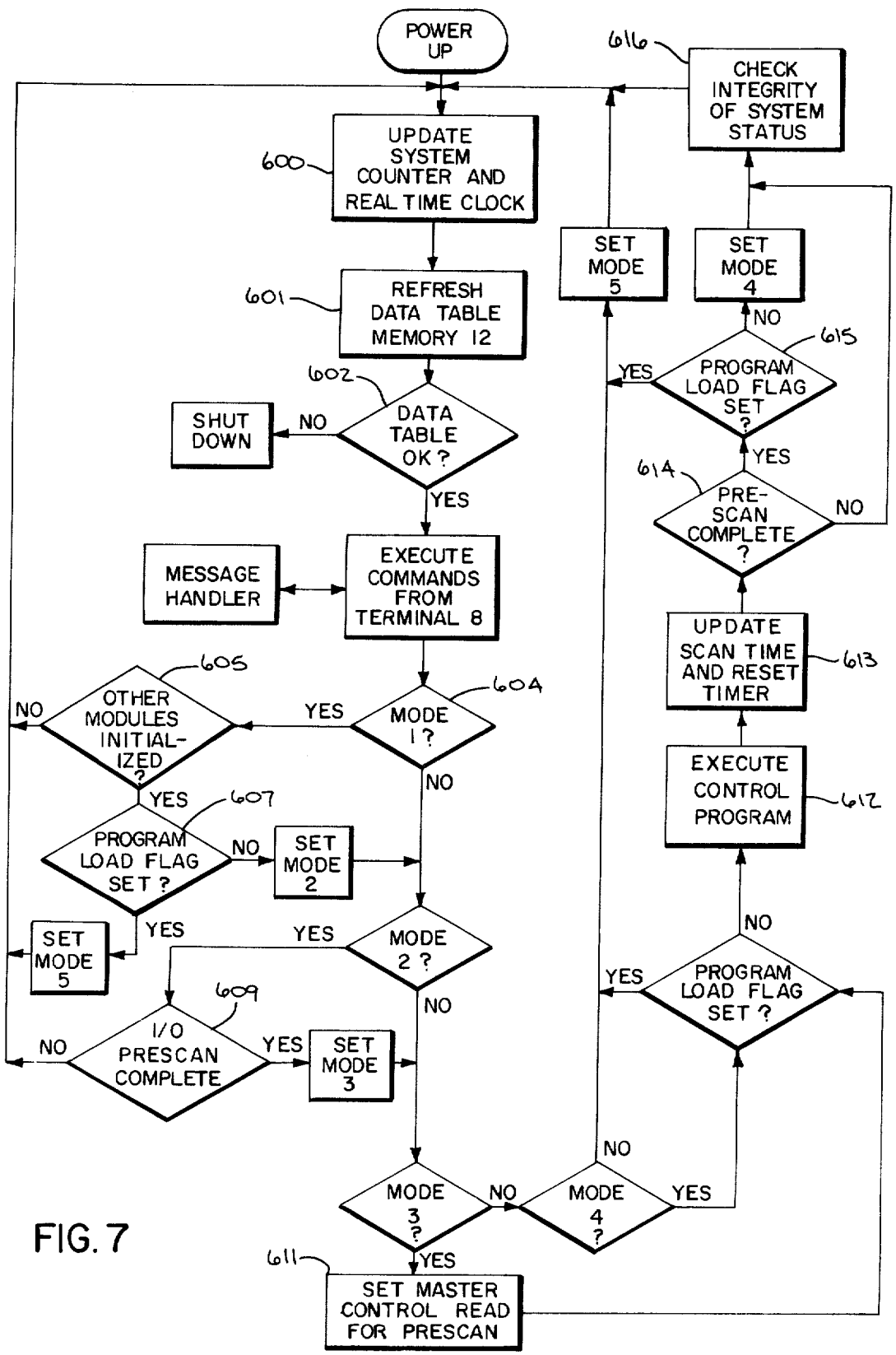
FIG. 7 is a flow chart of the functions performed by the CPU module of FIG. 1.

Referring particularly to FIGS. 1, 2 and 7, when the CPU module 3 is powered up it operates in one of five possible modes. In mode 1 the CPU module 3 is not processing, but is waiting for other modules in the system to initialize. In mode 2, it is waiting for the I/O scanner module 7 to perform a "prescan" which initializes the I/O image and data table memory 12 and the data table 623 in the memory module 2. In mode 3 the CPU module 3 performs a "program prescan" in which the control program is executed, but all output devices are disabled. Mode 4 is the "run" mode in which the control program is executed to operate the devices connected to the programmable controller, and mode 5 is the program load mode in which the control program is entered and edited from the programming terminal 8. The current CPU mode is stored in the CPU ram 12 and in the system status portion of the memory module 2.

Referring particularly to FIG. 7, regardless of the mode of operation, the CPU module 3 periodically performs a number of housekeeping chores. As indicated by process block 600, a set of instructions are executed to increment the system counter and the real time clock which are both stored in the system data portion 620 of the memory module 2. The system counter indicates to other modules in the system that the CPU module 3 is functioning and the real time clock provides day and time information. As indicated by process block 601 the CPU module 3 then refreshes certain data in its memory 12. More specifically, it reads data from the access control block portion 621 of the memory module 2 which indicates the memory location of various portion of the control program and the data table stored in the memory module 2. These "pointers" are maintained in the CPU memory 12 to reduce the time required to access data in the memory module 2 during execution of the control program. If this data is in error, as indicated by decision block 602, the CPU module is shut down and all output devices are disabled. Normally, however, the CPU module 3 next executes commands it has received from the programming terminal 8 as idicated by process block 603. As will be explained in more detail hereinafter, the CPU module 3 includes a message handler routine which communicates with other backplane modules, and which couples command messages from the system I/O scanner module 7 that supports the programming terminal 8. Such commands may be, for example, editing commands which call for the deletion or addition of instructions in the control program.

Referring still to FIG. 7, after these housekeeping functions have been performed, the CPU module 3 determines which mode it is operating in and performs the functions required. Immediately following power-up the CPU module is in mode 1 as determined by decision block 604, and the only function performed is to determine if the other modules in the system have been initialized and are ready to run. This is determined by instructions indicated by decision block 605 which examine a system status counter stored in the system data portion 620 of the memory module 2. As will be explained in more detail hereinafter, the system I/O scanner module 7 is responsible for setting the system status counter to the number of modules present during power-up. As each module initializes itself, it decrements the system counter. Until this counter is decremented to zero, the CPU module 3 remains in the mode 1 loop comprised of blocks 600–605.

When all system modules have initialized the CPU module 3 may switch to mode 2. Before doing so, however, a check is made to determine if the system has been set to the "program load mode." This is indicated at decision block 607 and is accomplished by examining the system mode field in the system status portion 620 of the memory module 2. As will be explained in more detail hereinafter, it is another one of the functions of the system I/O scanner module 7 to monitor the front panel switches through the front panel interface module 11 and to maintain the proper data in this system mode field.

In mode 2 the CPU module 3 waits for the I/O scanner module 7 to perform an I/O prescan in which the data tables in both memory module 2 and CPU ram 12 are initialized to the current state of all input devices connected to the programmable controller. Instructions indicated by decision block 609 are executed to examine an I/O prescan counter in the system status portion 620 of memory module 2. Each I/O scanner module 7 in the system decrements this I/O prescan counter when it has completed its prescan, and when the counter reaches zero, the CPU module 3 switches to mode 3.

In mode 3 the CPU module 3 executes a "prescan" of the control program to build a table of target addresses for jump instructions and subroutine calls as described in U.S. Pat. No. 4,115,853. As indicated by process block 611, a master control relay is first set by the CPU module 3 to insure that all logic decisions made during the control program prescan are false and that no output devices are energized. Also, during the prescan no branches jumps or subroutine calls are executed to insure that each and every instruction in the control program is fetched and executed. As indicated by process block 612, each control program instruction is fetched from the memory module 2, mapped to the proper microprogram in the CPU module 3 and executed. The last microinstruction in each microprogram includes a FETCH code which directs the CPU module 3 to read the next control program instruction from the memory module 2.

This sequence continues until the "END" instruction is fetched. The END instruction functions to reset the control program counter to the start of the control program 624 and to read the scan counter 76 (FIG. 4). The scan counter 76 is reset to zero and the scan time is saved in the system data section 620 as indicated by process block 613 in FIG. 11. The scan time is a measure of the time required to execute the control program and is particularly useful in time-critical applications where the effects of changes to the control program during program development cannot be easily predicted.

Referring still to FIG. 7, if the control program prescan is complete as determined at decision block 614, the CPU module 3 is ready to run. First, however, a check is made at decision block 615 to determine if the program load mode has been requested, but if not, the module is set to mode 4. Regardless of the mode, after the control program has been executed a check is made of the system data section 620 to determine if any major fault conditions have occurred as indicated at process block 616. The system loops back to commence another scan if no problems exist. Otherwise, the system shuts down.

SYSTEM I/O SCANNER MODULE

The system I/O scanner 7 is a single board microprocessor based module which directly interfaces the system backplane bus 1 with four serial I/O buses 409-412. The module 7 will also support communications with the front panel interface 11, and through a connector on the front panel interface 11, the system I/O scanner module 7 also supports the programming terminal 8.

Figure 6:
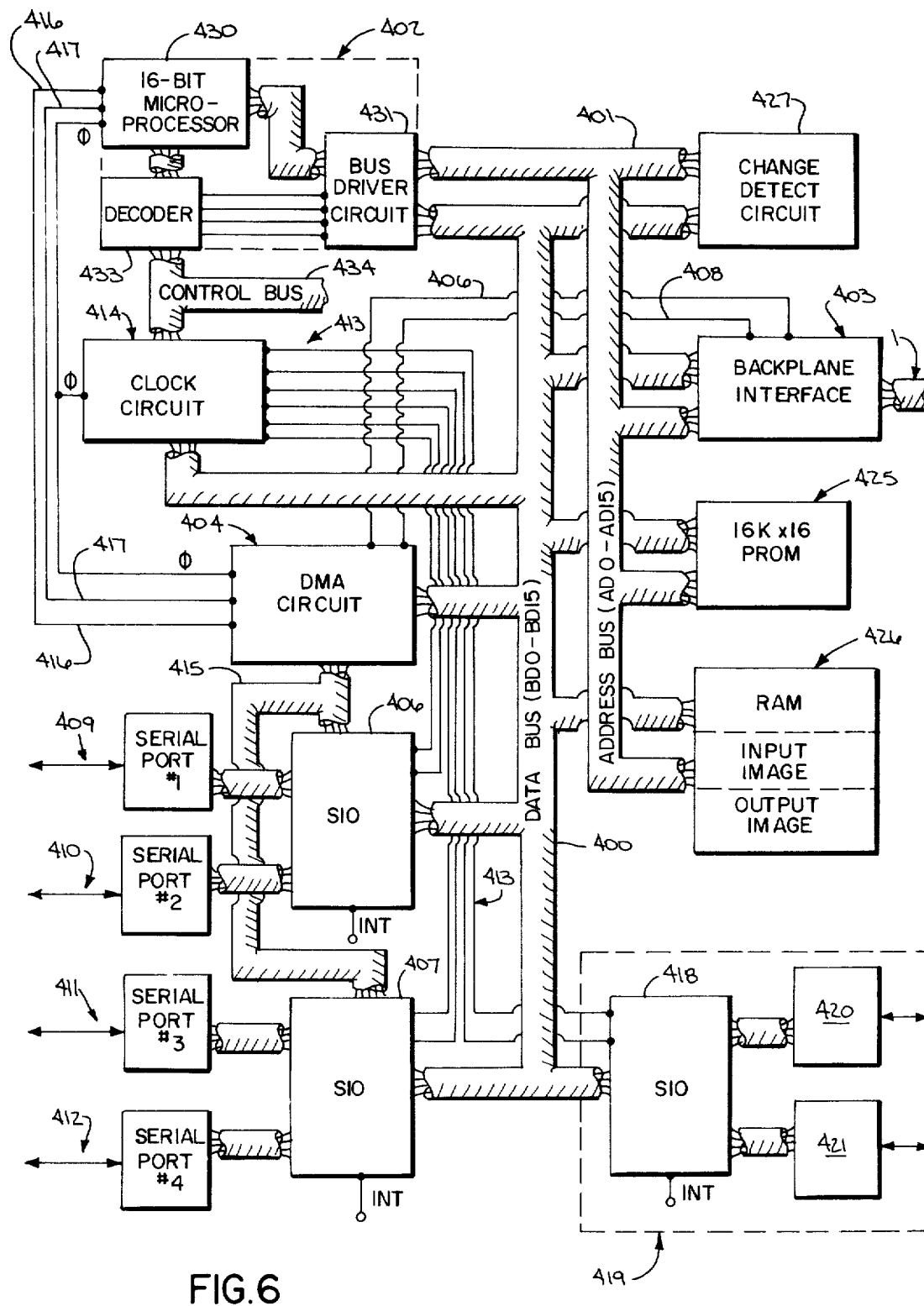
FIG. 6 is a block diagram of the I/O interface module which forms part of the system of FIG. 1.

Referring particularly to FIGS. 1 and 6, the system I/O scanner module 7 is structured about a sixteen-bit data bus 400 and a sixteen-bit address bus 401 which are controlled by a microprocessor circuit 402. The buses 400 and 401 are coupled to the system backplane bus 1 through a backplane interface circuit 403 and when data is to be transferred to or from the system backplane bus 1, the backplane interface circuit 403 makes a request to a DMA circuit 404 through a BPREQ control line 405. As will be explained in detail below, the DMA circuit 404 acknowledges the request through a BPACK control line 408 when the backplane interface circuit 403 can have access to the buses 400 and 401 to perform its data transfer. The structure and operation of the backplane interface circuit is described in detail in copending U.S. patent application Ser. No. 313,365 which was filed on Oct. 21, 1981 and is entitled "Modular Programmable Controller."

The DMA circuit 404 responds not only to requests from the backplane interface circuit 403, but also to similar requests received from two serial input/output circuits (SIOs) 406 and 407. The two SIOs 406 and 407 provide an interface to the four serial I/O buses 409, 410, 411 and 412 which connect to I/O racks 16. The two channels in each SIO 406 and 407 are driven by clock lines 413 which connect to a clock circuit 414. When the SIOs 406 or 407 are ready to transmit a message or have received a message from a serial port 409-412, they generate a request signal to the DMA circuit 404 through a bus 415. The DMA circuit 404 generates a DMA request to the microprocessor 402 through a request line 416, and when the microprocessor 402 completes execution of its current instruction, it grants the DMA request through a line 417. The DMA circuit 404 then takes control of bot the buses and the SIOs 406 and 407 to perform the message data transfer. When an end-of-message character is received by an SIO 406 or 407, it generates an interrupt request on control line INT to the microprocessor 402. As will be explained below, the microprocessor 402 responds to the interrupt by transferring the incoming message to the proper module in the system and by sending a message to one of the I/O racks 16.

Referring particularly to FIG. 12, a third SIO 418 also connects to the module data bus 400 and is driven through a pair of the clock lines 413. The SIO 418 forms part of a circuit 419 which interfaces the module 7 to the front panel 11 through a pair of serial ports 420 and 421. Both serial ports 420 and 421 connect to lines in the system backplane bus 1 which in turn connect to the ribbon connector leading to the front panel. Serial port 420 exchanges data at 4800 baud with the processor in the front panel circuit 11 and the serial port 421 exchanges data through an RS 232C connector which is mounted on the front panel. The programming terminal 8 attaches to this connector. The SIO 418 is interrupt driven and when data is received, the microprocessor 402 is interrupted and vectored to the proper interrupt service routine.

The microprocessor 402 operates in response to instructions which are stored in a read-only memory (PROM) 425. These include interrupt service routines which are executed in response to interrupt requests on the INT control line, programs for executing tasks and communicating through the system backplane 1 with other modules in the system, and programs for configuring and driving the SIOs 406, 407 and 418.

The primary function of the system I/O scanner module 7 is to couple input/output data between the I/O image and data table 12 in the CPU module 3 and the I/O racks 16 which connect to the scanner module 7. The speed with which the scanner module 7 performs this function is an important factor in the operation of the programmable controller system and the preferred embodiment of the invention provides a unique structure to accomplish this. More specifically, a random access memory (RAM) 426 connects to the module buses 400 and 401, and in addition to providing work space for the microprocessor 402, it stores a copy of the output portion of the CPU module's I/O image table memory 12. The microprocessor 402 continuously updates the image table in the RAM 426 by reading output status data from the CPU module 3 and reading input status data from the I/O racks 16. The microprocessor 402 also continuously writes its output image table data to the I/O racks 16 and writes its input status data to the CPU module 3. This continuous updating, or "refreshing", of the I/O devices and associated I/O image tables is done at a relatively low priority and it is performed regardless of whether or not changes are occurring in the status of input/output devices.

Superimposed on this I/O refresh process is a high speed I/O update process which couples data indicative of changes in input/output status data. When data is written to the image table in the RAM 426 by the CPU module 3 (via the backplane interface 403) a change detect circuit 427 is enabled and stores an indication of which line in the RAM image table 426 was changed. The microprocessor 402 operates to repeatedly test the change detect circuit for such changes in I/O status data, and when a change is detected, to rapidly relay the detected change on to the I/O rack 16. In this manner, changes in status data are rapidly processed while the continuous I/O refresh process of all I/O points is carried on in the background.

Referring particularly to FIG. 6, the microprocessor 402 is comprised of a 16-bit microprocessor 430 which couples to a bus driver circuit comprised of a 16-bit bidirectional data gates and a 16-bit address bus latch which are indicated collectively as bus driver circuit 431. The microprocessor control lines connect to gates and decoder circuits which are collectively indicated as decoder 433 and which drive a number of module control lines indicated collectively as control bus 434.

For a detailed description of the microprocessor 402, the clock circuit 414, the DMA circuit 404 and the change detect circuit 427, reference is made to the above-cited copending application Ser. No. 313,365.

Figure 8A:
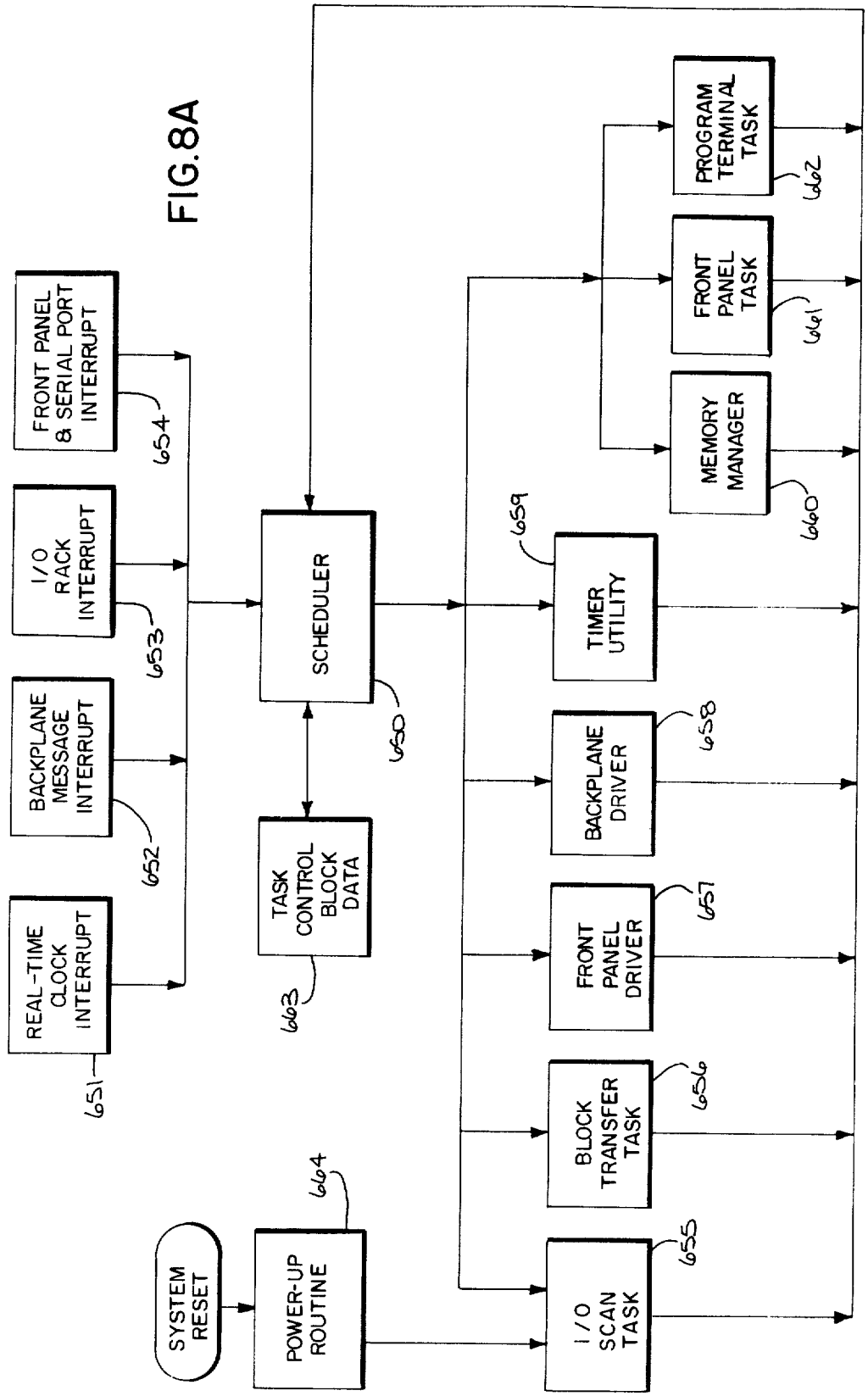
FIGS. 8A, 8B and 8C are charts illustrating the functions performed by the I/O scanner module of FIG. 1.
Figure 8B:
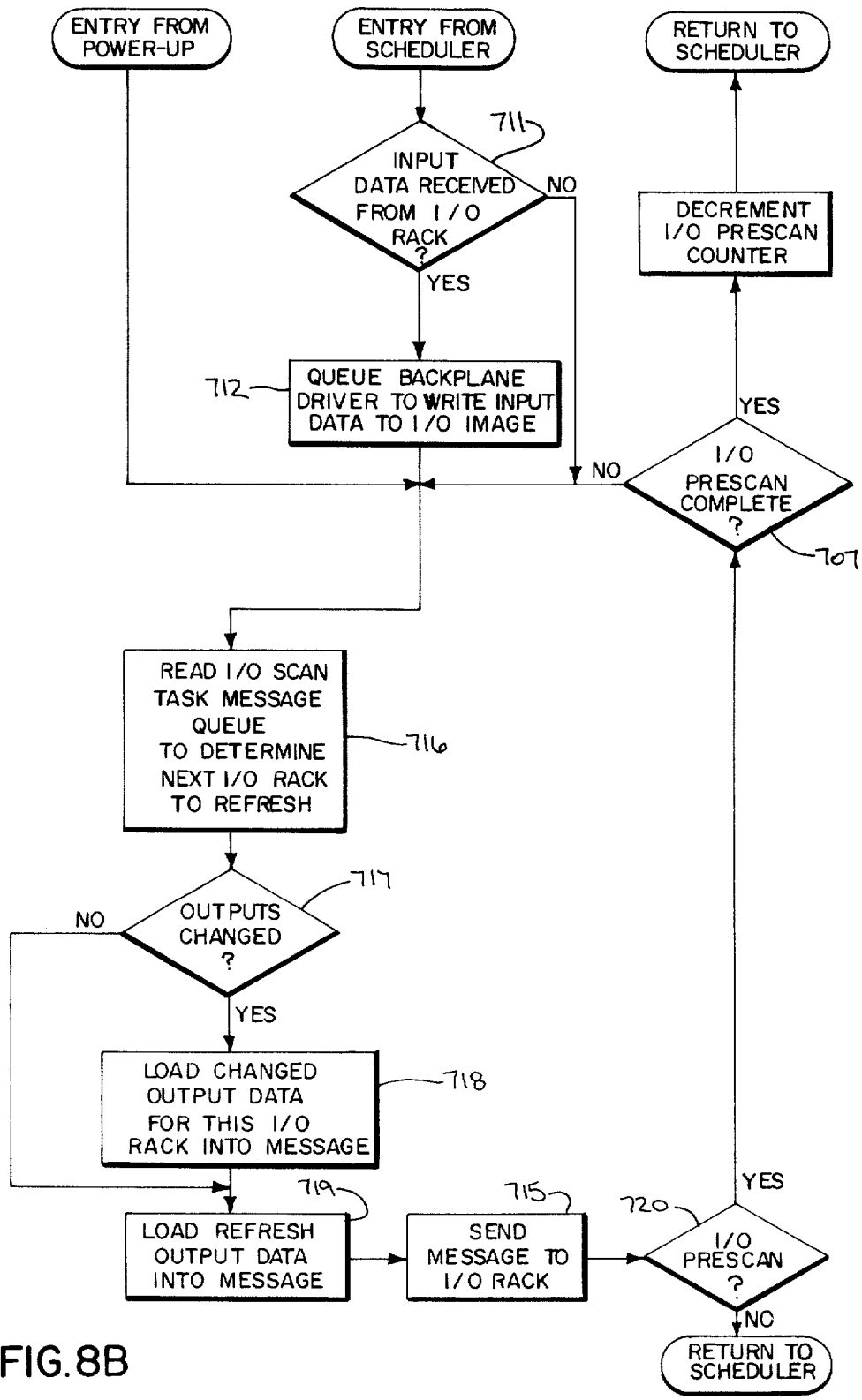

Referring particularly to FIGS. 1, 6 and 8A, the I/O scanner module 7 is responsible for initializing the programmable controller system during power-up, and for performing tasks associated with its six serial ports and its backplane interface. These functions are coordinated by a scheduler program 650 which is entered from any of four interrupt service routines 651-654 or from any of eight task programs 655-662. The scheduler 650 determines which of the tasks 655-662 should be executed by examining a linked list of task control blocks which are stored in the RAM 426 and indicated at 663. If more than one task is to be executed, the scheduler selects that task having the highest priority. That is, the scheduler examines the task control blocks 663 to determine if the I/O scan task 655 is to be executed, then it determines if the block transfer task 656 is to be executed, followed by the front panel serial driver 657, the backplane driver 658 and the timer utility 659. One of the three tasks 660, 661 or 662 is then given priority and the cycle repeats.

The task control blocks 663 store bits of data which indicate those tasks that are ready to be executed. These bits may be set by any of the tasks or by one of the interrupt service routines 651-654. For example, when the real time clock interrupts every one millisecond, the interrupt service routine 651 is executed to make an entry into the task control block 663 which indicates that the timer utility task 659 is to be executed. The scheduler 650 is then entered, and if no other tasks are ready to run, or if the timer utility 659 has priority, the task 659 will then be executed. An interrupt from the front panel 11 or the serial port on the front panel 11 is serviced by the routine 654 which sets a bit in the task control block 663 for either the front panel task 661 or the program terminal task 662. When these tasks 661 or 662 are executed, they may in turn set a bit in the task control block for the front panel driver task 657. The task 657 transmits data back to the front panel 11 or the program terminal 8.

When an interrupt occurs as a result of data received from one of the I/O racks 16, the service routine 653 is executed. This I/O rack interrupt service routine 653 not only determines which I/O rack 16 requires service, but it also determines if a block transfer of data from the I/O rack 16 has occurred. If so, the block transfer task 656 is enabled; otherwise, the I/O scan task 655 is enabled. The block transfer function is described in more detail in U.S. Pat. No. 4,413,319 which is entitled "Programmable Controller for Executing Block Transfer With Remote I/O Interface Racks."

Referring particularly to FIGS. 1, 6, 8A and 8B, the power-up routine 664 in the I/O scanner module 7 is responsible for initializing the programmable controller system during power up. After this initialization, the I/O scan task 655 is entered and an I/O prescan is performed. Thereafter, each time the I/O scanner module 7 receives a message from an I/O rack 16, an interrupt is generated and the I/O rack interrupt routine 653 is executed to queue up the I/O scan task 655. When the I/O scan task is subsequently entered, a check is made at decision block 711 to determine if input data was received. If it was, this data is written into a message queue for the backplane driver task 658 and that task is enabled to write the data to the I/O image table in the CPU module RAM 12 as indicated at process block 712. After the input data has been processed, the I/O scanner module 7 sends output messages to the I/O racks 16. As indicated by process block 716, the message queue for the I/O scan task is examined to determine the next I/O rack 16 to receive refresh output data from the I/O scanner module's output image table. In addition, the change detect RAM 475 is examined to determine if any outputs involving the same I/O rack 16 have been changed. This is accomplished by instructions indicated by decision block 717, and when "change" data is found, it is loaded into the output message queue as indicated by process block 718. As indicated by process block 719, the refresh data is loaded into the output message queue, and it, along with any change data, is sent to the proper I/O rack 16. A test is made at decision block 720 to determine if this is part of the I/O prescan process, and if not, the I/O scanner module 7 returns to the scheduler to perform other tasks.

The programming terminal 8 is a self-contained unit which may be disconnected from the programmable controller and employed with other similar controllers to develop and edit their control programs. Referring to FIG. 1, the terminal 8 includes a controller module 700 which drives a cathode ray tube (CRT) 701 that may be viewed through a front bezel 702. A keyboard 703 is mounted beneath the CRT 701 and is supported by a removable application module 704. As described in copending U.S. patent application Ser. No. 186,254 filed on Sept. 11, 1980 and entitled "Industrial Terminal," the application module 704 and attached keyboard 703 may be removed from the control module 700 and replaced with other modules 704. In this manner the terminal 8 may be easily adapted for use with various types and models of programmable controllers.

Figure 10:
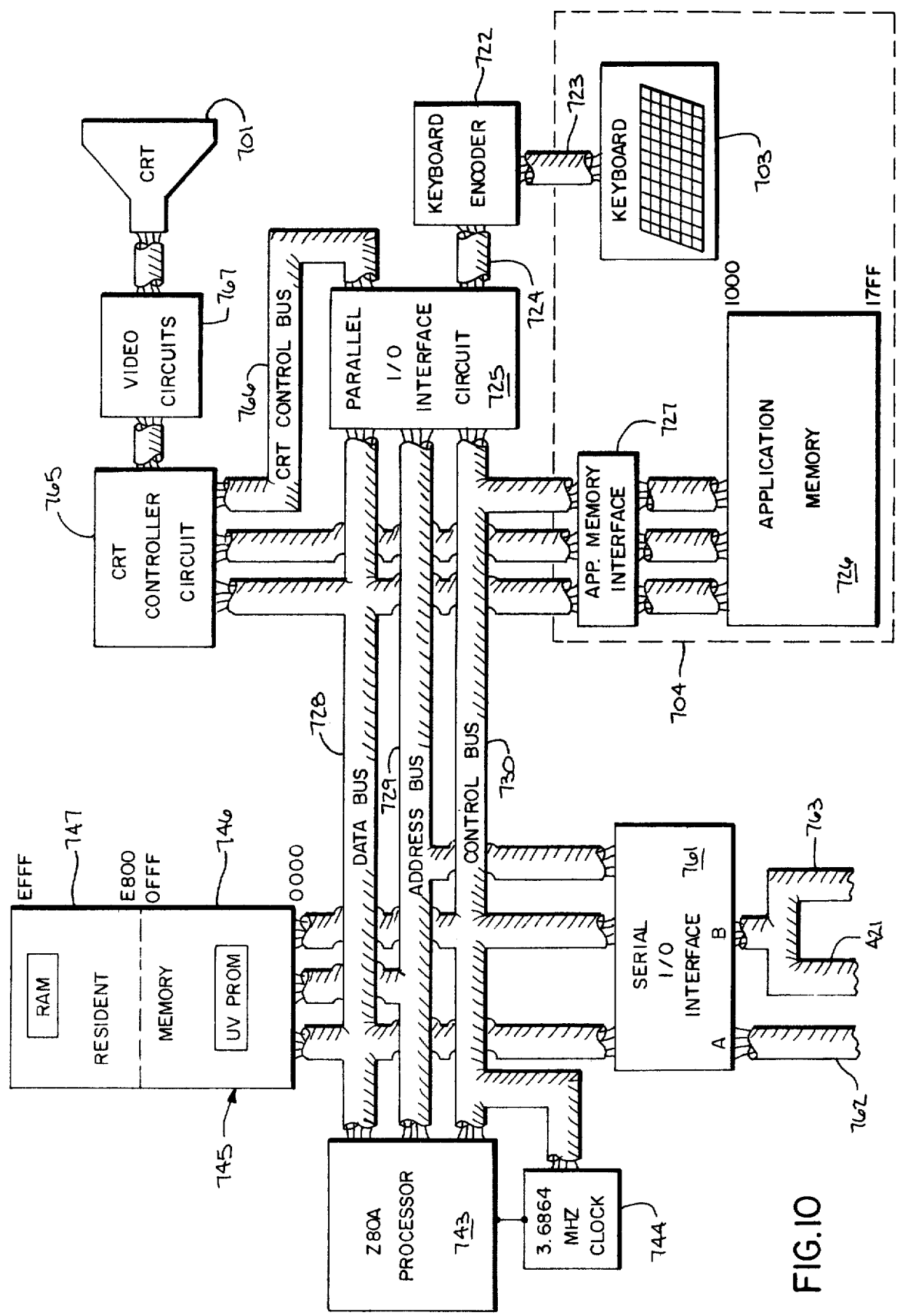
FIG. 10 is an electrical block diagram of the programming terminal which forms part of the system of FIG. 1.

Referring to FIG. 10, the application module 704 and the controller module 700 are seen in schematic form. The controller module 700 is directed by a main processor 743 that is coupled to an 8-bit data bus 728, a 16-bit address bus 729 and a control bus 730. A 3.6864 megahertz clock circuit 744 is connected to a clock terminal on the processor 743 to provide timing signals for the processor 743, and the clock circuit 744 is also connected through the control bus 730 to provide timing signals to other circuits in the terminal 8.

The main processor 743 fetches and executes instructions from a resident memory 745, which is also connected to the main buses 728-730. The resident memory 745 includes from 2k to 4k × 8-bits of UV PROM memory 746 and four 1k × 4-bit RAM memory chips 747. The UV PROM 746 has address inputs connected to lines A0-A10 of the main address bus 729, while the RAM memory chips 747 have inputs connected to lines A0-A9 of the address bus 729. The UV PROM memory 746 and RAM memory 747 have eight data terminals connected to lines D0-D7 of the main data bus 728.

Referring particularly to FIG. 10, the main processor 743 in the terminal 8 is coupled to external devices through a serial I/O interface circuit 761 which connects the main terminal buses 728-730 to serial I/O ports A and B and three serial I/O channels 762, 421 and 763. The serial I/O channel 762 is employed to interface with conventional computer equipment employing the standard RS-232-C protocol and the serial I/O channel 763 is employed to operate a programmable controller such as that described in U.S. Pat. No. 4,165,534. Serial I/O channel 421 is employed to communicate with the programmable controller of the present invention.

The main processor 743 in the terminal 8 is also connected through the address and data buses 728 and 729 to a CRT controller circuit 765. A parallel I/O interface circuit 725 is also connected to the main buses 728-730 and four of its outputs are connected to the CRT controller circuit 765 through a CRT control bus 766. The CRT controller circuit 765 maintains an image of the characters to be displayed on the CRT 701, and directs the coupling of these characters through video circuits 767, which translate the data to the video information required by the CRT 9.

Eight additional I/O terminals on the parallel I/O interface circuit 725 connect through a bus 724 to a keyboard encoder circuit 722. The keyboard encoder 722 is a MM5740 integrated circuit which is commercially available from National Semiconductor Corporation. The keyboard 703 is coupled to the encoder circuit 722 by a keyboard matrix bus 723, and when a key is depressed, a unique 8-bit code is generated by the encoder circuit 722 and coupled by the I/O circuit 725 to the processor 743.

In addition to the keyboard 703, the application module 704 contains an application memory 726 which is coupled to the main buses 728–730 by an interface circuit 727. The application memory 726 may include up to 10k × 8-bits of RAM and 88 K × 8-bits of ROM memory, with the type and amount being determined by the particular application of the terminal 8. Whereas the programs and data stored in the resident memory 745 are general purpose in nature, the programs and data stored in the application memory 726 are dedicated to the particular use for which the application module 704 is designed. In the preferred embodiment, the programs stored in the application memory 726 are dedictated to the development and editing of control programs for the programmable controller system of FIG. 1.

For a more detailed description of the circuits employed in the terminal 8 and functions performed by the programs resident in the memory 745, reference is made to copending U.S. patent application Ser. No. 186,254 filed on Sept. 11, 1980 and entitled "Industrial Terminal", which is incorporated herein by reference. For a detailed description of its mechanical construction, reference is made to U.S. Pat. No. 4,326,193 entitled "Terminal With Interchangable Application Module".

When the programmable controller of FIG. 1 is in the program load mode of operation, control program instructions may be entered into the memory module 2 from the keyboard 703 of the terminal 8. The command data generated by depressing keys is output by the terminal 8 through the serial channel 421 and is received by the system I/O scanner module 7. Referring to FIG. 8A, the program terminal task 662 is queued up when a command is received from the terminal 8. It is a function of this task 662 to decode the command and to perform the appropriate function.

The protocol employed on the serial data link 421 assumes that the terminal 8 is the master of the link and that the system I/O scanner 7 will respond to commands received from the terminal 8. The format of a command is as follows:

|STX|Sequence Count|Data size|- DATA -|ETX|CHECKSUM| where: STX = start of transmission byte (02H)
Sequence Count = number of the current command in a sequence of commands
DATA SIZE = number of bytes of data in this command
ETX = end of transmission byte (03H)
CHECKSUM = 8-bit sum of the data block The system I/O scanner 7 responds to a received command with an ACK character (06 Hexadecimal) if the data was received correctly and with a NAK character (15 Hexadecimal) if a transmission error was detected. In addition, the I/O scanner 7 decodes the first byte of the received data to determine the function it is to perform. Some of these functions require that the I/O scanner 7 obtain data from the memory module 2 and form a command containing this data for transmission back to the terminal 8. Such a responsive command has the same format as indicated above, and typically, the terminal 8 acknowledges the received data with either an ACK or NAK character. The terminal 8 can also acknowledge with an "SO" character which indicates that no further data should be sent until an "SI" character is transmitted by the terminal 8.

Although the system I/O scanner module 7 is responsive to a large number of different commands received from the terminal 8, the following are employed to carry out the functions of the present invention.

READ BLOCK—The command code (1 F Hexadecimal) is accompanied by an address which indicates where in the memory module 2 the data is located and by a size number which indicates the number of bytes of data to be read. If the size number is zero, the entire file is to be read. The I/O scanner module 7 reads the data from the memory module 2 and transmits it to the terminal 8 for display. This command is employed to read comment data.

WRITE BLOCK—The command code (20 Hexadecimal) is accompanied by an address which indicates where the data is to be written, by a size number which indicates the number of data bytes to be written, and by the data bytes themselves. The I/O scanner module 7 writes the data bytes to the indicated address and forms a responsive command which is transmitted to the terminal 8 to indicate that the operation has been completed. Comment data is written to the memory module 2 using this command.

CREATE FILE—The command code (17 Hexadecimal) is accompanied by an address which indicates the location in the memory module 2 where a file is to be established. A size number in the command indicates the number of bytes in the indicated file and the I/O scanner module 7 operates in response to this command to create a new file in the memory module 2.

GAP—The command code (21 Hexadecimal) is accompanied by a file number which identifies a previously created file that is to be expanded in size. A size number indicates the size in bytes to which the file is to be increased.

UNGAP—The command code (22 Hexadecimal) is accompanied by a file number which identifies a previously created file that is to be reduced in size. A size number indicates the size in bytes to which the file is to be reduced.

Figure 11:
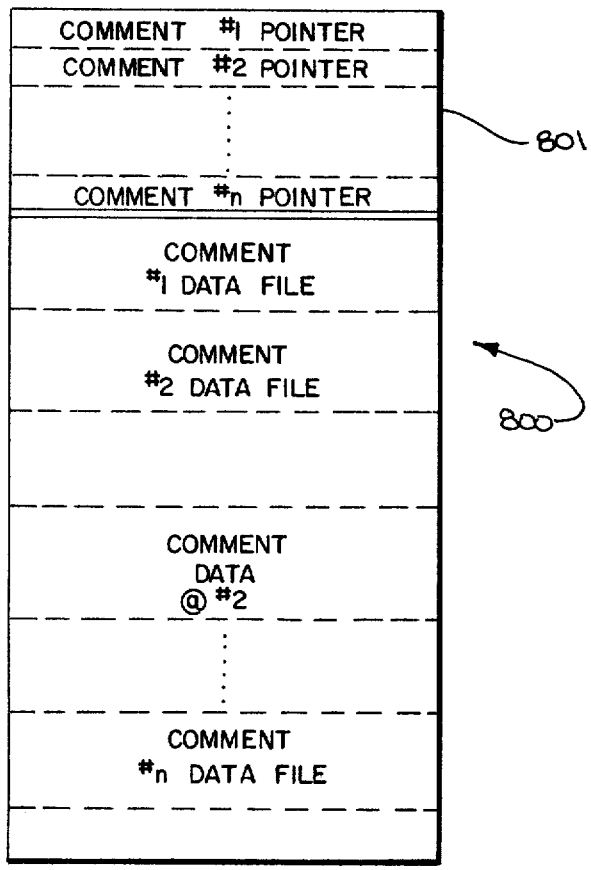
FIG. 11 is a schematic diagram of the comment section data structure which forms part of the system of FIG. 1.

Referriing particularly to FIGS. 1 and 11, the comment files created by the CREATE FILE commands received from the terminal 8 are stoed in a comment section 800 of the memory module 2. Each comment data file in this section is comprised of a string of ASCII characters which may be read and transmitted to the terminal 8 where they are applied to the CRT controller circuit 765 to produce a string of alphanumeric characters on the CRT 701. The comment section 800 also stores a series of corresponding pointers 801. Each pointer 801 stores the address of its corresponding comment data file, and to read the comment data in file number four, for example, its comment pointer is read first from the pointer section 801. Using this pointer, the address of the first character in comment data file four can then be directly accessed. It should be apparent to those skilled in the art that this data structure enables the comments to be of variable length without wasting memory space. It should also be apparent that the creation of a new comment data file requires the creation of a corresponding pointer.

Referring particularly to FIGS. 6 and 8A, the program terminal task 662 in the I/O scanner module 7 is primarily responsible for maintaining the comment section 800. When a command is received from the terminal 8, the front panel and serial port interrupt service routine 654 is executed to input all the command message characters and store them in an input buffer in the RAM 426. The interrupt routine 654 also queues up the program terminal task 662 by setting a bit in its task control block 663 which indicates to the scheduler 650 that the task 662 should be executed.

Figure 8C:
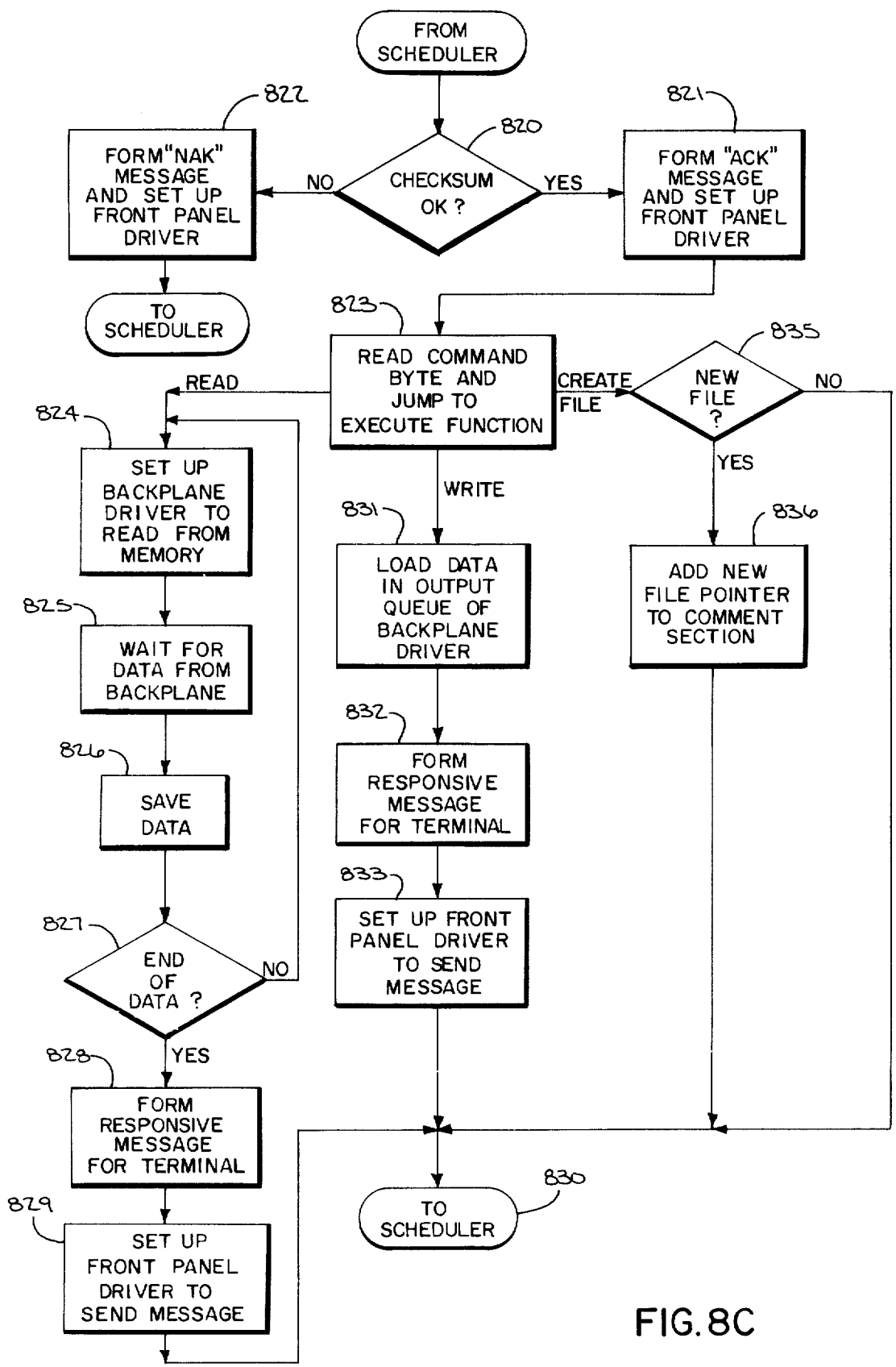

Referring particularly to FIGS. 8A and 8C, when the task 662 is subsequently entered from the scheduler, instructions indicated by decision block 820 are executed to determine if the command message was received accurately from the terminal 8. If so, an ACK character is sent back to the terminal by queueing up the front panel driver task 657 as indicated by process block 821. Otherwise, a NAK character is returned as indicated by process block 822 and the task exits back to the scheduler to await receipt of another command from the terminal 8.

As indicated by process block 823, when a command is received from the terminal 8, the command byte is analyzed to determine which function is to be performed. If a block of comment data is to be read from the comment section 800 of the memory module 2, the address is extracted from the READ BLOCK command and is passed to the backplane driver task 658, as indicated by process block 824. The program terminal task 662 is then placed in a wait state as indicated by process block 825, while the backplane driver task 658 reads the addressed data from the memory module 2. When the data is received, it is saved in an output buffer, as indicated by process block 826, and then the size number in the READ BLOCK command is checked to determine if all the data has been read. If not, as indicated by decision block 827, the system loops to read the next data word from the memory module 2. When all of the data has been read, it is formatted as described above to form a responsive command message to the terminal 8 as indicated by process block 828. The front panel driver task 657 is then queued up, as indicated by process block 829, to send the responsive command to the terminal 8 and the program panel task 662 then returns to the scheduler at 830.

When a WRITE BLOCK command is received from the terminal 8, as determined at process block 823, the comment data is extracted from the WRITE BLOCK command and passed to the output queue of the backplane driver task 658. As indicated at process block 831, the program terminal task 662 then waits for a reply that the data has been written to the addressed memory location by the backplane driver task 658. As indicated by process block 832, a responsive message is then formed which indicates whether the write operation has been successfully performed, and this is passed to the front panel driver task 657 for transmission to the terminal 8 as indicated by process block 833. The program terminal task 662 then returns to the scheduler at 830.

When a CREATE FILE command is received from the terminal 8, as determined at process block 823, a check is made to determine whether the file already exists. As indicated at decision block 835, this is accomplished by searching the comment section 800 of the memory module 2 for a pointer 801 which corresponds to the file number in the command. If none is found, a pointer is calculated for the new file and is written to the pointer portion 801 of the memory module 2 as indicated by process block 836.

It should be apparent that with these limited commands the system I/O scanner module 7 functions at a rather primitive, basic, level. The higher level functions, and particularly, those functions which are visable to the user are carried out by the programming terminal 8.

Referring particularly to FIGS. 10 and 12, the terminal 8 performs a number of tasks under the direction of programs stored in its application memory 726. The operation of these tasks is managed by an operating system which includes a scheduler 840. Associated with each task is a task control block and these are linked together in the order of their priority and stored in the memory 726 as block 841. After an initialization task 842 is executed during power-up, the scheduler 840 is entered and executed to determine the highest priority task which is ready to execute. After the execution of that task, the scheduler 840 is re-entered to determine the next task to be run. A display processor task 846 is the lowest priority task and it is always ready to execute. As a result, the display processor task 846 is a background program which is executed when all other tasks are complete.

There are four main tasks which are required to operate the terminal 8 as a programming terminal for the programmable controller. These include a processor interface task (PIT) 843, a keyboard processor task 844, an instruction buffer manager task (IBM) 845, and the display processor task 846. In addition, there are two interrupt handler programs 847 and 849 which respond to interrupts generated respectively by the keyboard 703, and the serial interface 761 which connects to the programmable controller. When a key is depressed, for example, an interrupt occurs and the system is vectored to the keyboard interrupt handler 847. The handler 847 places the ASCII character received from the keyboard in a buffer and it queues up the keyboard processor task 844 for subsequent execution. Similarly, when a character is received by the serial interface 761 from the programmable controller or sent to the programmable controller, an interrupt occurs and the system is vectored to the serial channel interrupt handler 849. The handler 849 queues up the processor interface task 843 for execution.

The processor interface task (PIT) 843 is responsible for all communications between the terminal 8 and the programmable controller. For example, another task in the terminal 8 may issue a command for the PIT 843 to fetch data from the programmable controller memory module. The PIT 843 formats the command into the protocol described above for the serial communication link and sends it to the programmable controller. When the programmable controller responds with the requested data, PIT 843 translates it into the format employed by the terminal 8 and notifies the task which issued the command that responsive data is available. In addition to responding to specific commands to read or write data to the programmable controller, PIT 843 also maintains an image of portions of the programmable controller's data table 623. This image is updated constantly as the background operation of the processor interface task 843, and it includes only those portions of the data table 623 which relate to the ladder diagram currently being displayed on the CRT 701.

Those portions of the processor interface task 843 relevant to the present invention are shown in FIG. 17. When a READ COMMENT command is received from another task as determined at decision block 900, the PIT 843 forms a READ BLOCK command which it sends to the programmable controller as indicated at process block 901. When the requested comment data is successfully received from the programmable controller, it is stored in a buffer which was identified by the task which issued the READ COMMENT command as indicated at 902. When all of the comment data has been read from the controller memory 2, PIT 843 notifies the requesting task that its READ COMMENT command has been executed as indicated at block 904. PIT 843 then performs its background function as indicated at process block 903.

Referring still to FIG. 17, when a WRITE COMMENT command is issued to the processor interface task 843 as detected at block 905, a CREATE FILE command is formed and transmitted to the programmable controller as indicated at block 906. When a response is received that the file has been created, a WRITE BLOCK command is formed using the comment data identified by the requesting task. As indicated by process block 907, this is sent to the programmable controller and stored in the comment section 800 of the memory module 2. When a response is received back that the comment data has been stored, PIT 843 notifies the requesting task that the command has been executed, as indicated at process block 908, and it then resumes its background function of updating the data table image in the terminal 8.

The keyboard processor task 844 is responsible for reception, acknowledgement, and processing of all inputs through the keyboard 703. It maintains the data currently in the keyboard command buffer for display on line 21 of the CRT 701 and it provides any prompting messages required by the user for display on line 22 of the CRT 701. The keyboard processor task 844 not only inputs the user commands and checks for syntax errors, but it also interprets the command and branches to a corresponding program which executes the command. There are many different user commands which are processed in this manner, but only three will be discussed in connection with the comment feature of the present invention.

Figure 13:
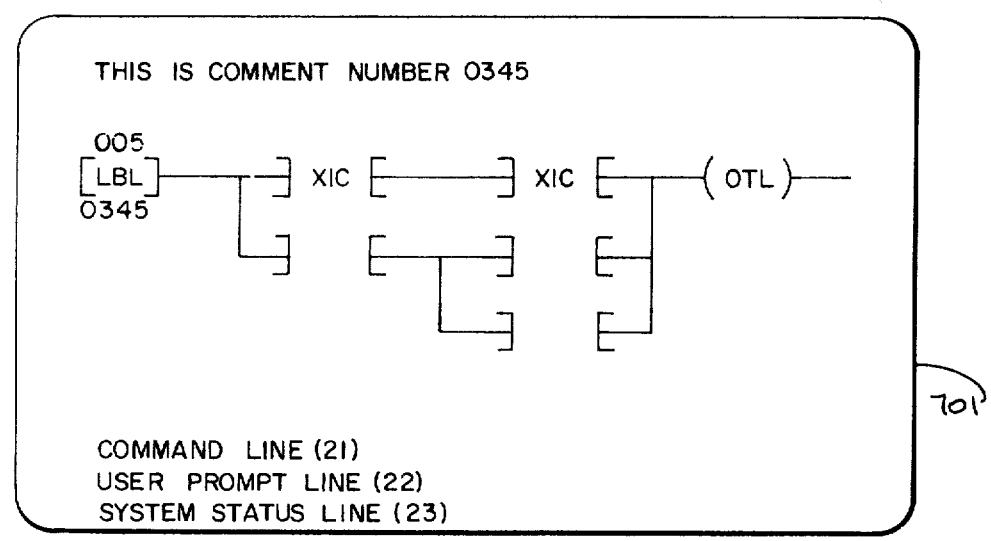
FIG. 13 is a pictoral representation of the display on the programming terminal of FIG. 10.

The first type of command is the addition, insertion or replacement of a control program instruction. This function is performed when the terminal 8 is in an edit mode. When a control program instruction has been entered on the command line, it is added to the ladder diagram at the point where the CRT cursor is positioned and it is then transmitted to the memory 2 of the programmable controller. The keyboard processor task 844 examines the control instruction mnemonic (i.e. XIC, OTE, LBL, etc.) after it is entered, and if valid, branches to a corresponding routine which prompts entry of the necessary parameters. This routine also formats the instruction data for display in ladder diagram format on the CRT 701. In the preferred embodiment, for example, when a comment is to be added to the control program for display on the CRT 701, an LBL control instruction is added at the beginning of a rung along with a comment number. The format of the entry is provided below and the rung diagram representation of this instruction is shown in FIG. 13.

LBL, aaa, bbbb where:
aaa is a 3-digit label number which identifies this instruction as the tartget address of a jump or call for subroutine instruction; and
bbbb is a 4-digit comment number which identifies the comment data for this rung.

Referring particularly to FIG. 14, the second command which relates to the present invention is employed to enter and edit the comment data. The format of this command is as follows:

ME, bbbb where: bbbb is the comment number.

If the comment has not been entered previously, it is created by this command, otherwise the indicated comment is read from the comment section 800 of the programmable controller memory 2 as indicated by process block 850 and displayed on the terminal's CRT 701 as indicated by process block 851. The comment data is also stored in an editor buffer in the terminal memory 747 where it may be changed by subsequent user entries.

The message edit (ME) command directs the keyboard processor task to a screen editor program indicated by process block 852. The screen editor enables the user to move the CRT cursor in any direction, enter comment data, and delete comment data. After the comment has been entered, the contents of the editor buffer are transmitted to the comment section 800 of the controller memory 2 using the processor interface task 843 as indicated at 853.

Referring still to FIG. 14, a third command which relates to the present invention is the display rung (DR) command. This command is accompanied by a rung member which identifies which rung in the ladder diagram repesentation of the control program is to be displayed. In response, the keyboard processor task 844 issues a command to the instruction buffer manager task 845 to display the control instructions indicated by the rung number as indicated by process block 855. The IBM task 845 issues commands to the processor interface task 843 to read the identified control instructions from the controller memory 2, and when this data is received, the IBM task 845 translates it into a form employed in the "instruction buffer" of the terminal 8. As will be explained below, the display processor task 846 analyzes this data to determine if comment data should also be read from the controller memory 2 for display at terminal 8.

Referring again to FIG. 12, the display processor task 846 is responsible for the maintenance of the ladder diagram display on the CRT 701, as well as the command line and status line. The task 846 is executed as a system background program, and its primary function is to update the data which is to be displayed by the CRT controller circuit 765 (FIG. 10). Such data includes the instruction buffer which is stored in the resident RAM 747 and which is comprised of an ASCII character representation of a portion of the control program stored in the programmable controller memory 2. The data to be displayed also includes status data and comment data stored in respective RAM buffers.

Figure 15:
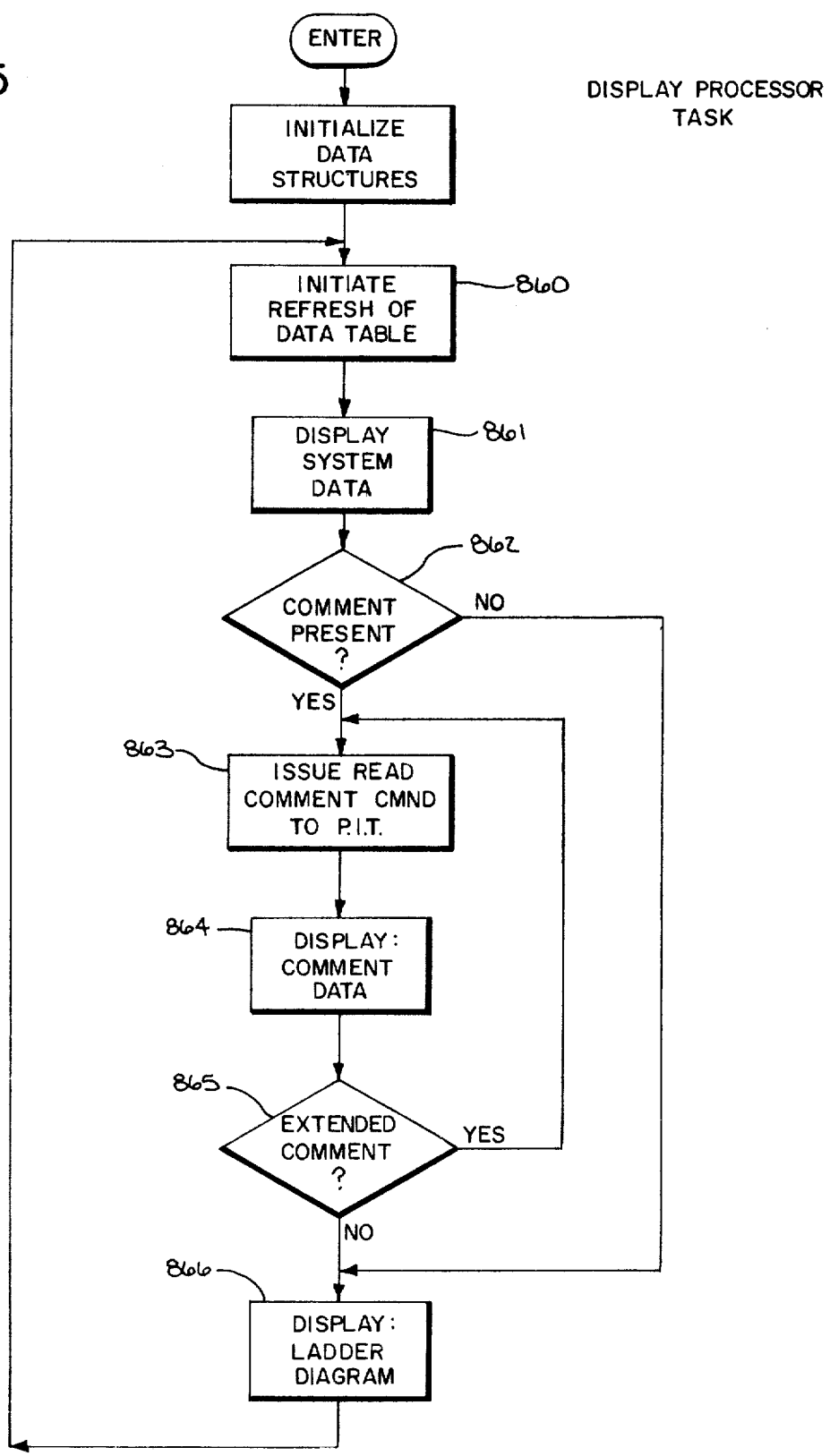
FIG. 15 is a flow chart of the display processor task which forms part of FIG. 12.

Referring particularly to FIG. 15, after initialization the display processor task 846 operates in a loop in which a series of functions are performed. As indicated by process block 860 the first function is to initiate a request that the terminal's data table image be refreshed. This request is made to the instruction buffer manager task 845 and it serves as a means for coordinating the execution of the varius terminal tasks with the CRT display 701. Next, the display task 846 updates the status line on the CRT 701 with system status data as indicated by process block 861, and then a determination is made at decision block 862 as to whether comment data is to be displayed. This is accomplished by examining the first control instruction presently in the instruction buffer to determine if it is an LBL instruction accompanied by a comment number. If so, the display processor task 846 issues a read command to the processor interface task 843 for the comment data as indicated at 863. When the comment data is received it is placed on the display 701 as indicated at process block 864, and it is then examined from an ASCII "@" character followed by another comment number. If found, as determined at decision block 865, another block of comment data is to be appended to the end of the previous comment and the system loops to retrieve the indicated comment data. After all the comment data is displayed, the display processor task 846 transfers the contents of the instruction buffer to the CRT controller circuit 765 (FIG. 10) to display the current rung of the ladder diagram as indicated at process block 866. The system then loops to repeat the process.

It should be apparent that an indefinite number of comments can be combined in any desired order merely by chaining them together with an "@" followed by the next comment number in the chain. This reduces the amount of stored comment data by eliminating the need to duplicate commonly used phrases, sentences or paragraphs.

Referring particularly to FIGS. 12 and 16, the instruction buffer manager task 845 is responsible for the support and management of the instruction buffer employed by the display task 846. When the IBM task 845 is requested, as determined at decision block 870, any one of a number of functions may be performed. Such a function may be requested by the keyboard processor task 844, such as a CRT cursor movement as indicated by decision block 871. When a refresh request is received from the display task 846, as determined at decision block 872, the IBM task issues a command to the processor interface task 843 to update the image table in the terminal 8. The ladder diagram data in the instruction buffer is also updated as indicated by process block 873. The IBM task 845 also performs a synchronization function as indicated at decision block 874. The requesting task indicates the number of refresh cycles that are to occur, and when they occur, the IBM task 845 generates a response to the requesting task, as indicated by process block 875.

A major function of the IBM task 845 is to translate control program instructions from the format employed in the programmable controller to the format employed in the instruction buffer of the terminal 8. More specifically, any request for a rung of control program instructions is made to the IBM task 845 and detected at decision block 876. The IBM task 845 forms a command to the processor interface task 843 as indicated by process block 877, and when the requested data is returned by the processor interface task 843, the IBM task 845 converts it to the terminal format and stores it in the instruction buffer for use by the display task 846. Similarly, as indicated at decision block 878 and process block 879, when a rung of control instruction data is to be sent to the programmable controller, a request is made to the IBM task 845. The rung of control instruction data is converted to the instruction format employed in the programmable controller and a write command is issued to the processor interface task 843 to send the converted data to the programmable controller memory 2.

It should be apparent that a number of variations can be made from the preferred embodiment of the invention. Whereas the comment data 800 is stored in the programmable controller memory 2 along with the control program 624, this is not required. Other possible arrangements would store the comment data in the memory of the terminal 8. Such comment data may be loaded into the terminal 8 from a central computer, a magnetic cassette unit or a floppy disc controller unit just prior to connection with the programmable controller. Also, the comment data need not be limited to alpha-numeric characters, but instead, may include graphic symbols which are combined to provide a pictoral display of a portion of the controlled machine or process.

We claim:

1. In a programmable controller system which includes a processor that executes a control program stored in the processor's memory to operate a machine and a program terminal which is coupled to the processor's memory to enable a user to enter and edit the stored control program through a keyboard and to display the stored control program on a display device, the improvement therein comprising:

means coupled to the program terminal keyboard for receiving manually entered data which designates a location in the stored control program;

first input means coupled to the program terminal keyboard for receiving a comment instruction which is manually entered through said keyboard including means for producing a corresponding mnemonic and comment number which are written into the designated location in the stored control program;

comment storage means coupled to the program terminal;

second input means coupled to the program terminal keyboard for receiving comment data and an associated comment number including means for writing said comment data and associated comment number into said comment storage means;

means coupled to the program terminal display device for reading stored control program instructions and displaying symbolic representations of the control program instructions which includes:

(a) means for detecting the comment instruction mnemonic when read from the stored control program for display;

(b) means responsive to the comment number stored with the detected comment instruction mnemonic for fetching the corresponding stored comment data from the comment storage means; and (c) means for applying the fetched comment data to the program terminal display device for displaying the same to the user;

wherein the processor includes means for inhibiting the execution of the comment instructions stored in the control program.

2. The programmable controller system as recited in claim 1 in which the comment storage means is a memory coupled to the processor of the programmable controller system.

3. The programmable controller system as recited in claim 1 in which the means coupled to the program terminal display device for reading stored control program instructions and displaying symbolic representations thereof includes means for displaying the control program instructions as elements of a rung in a ladder diagram, and the means for applying the fetched comment data also includes means for displaying the rung which contains the detected comment instruction.

4. The programmable controller system as recited in claim 1 in which the comment storage means stores data for a plurality of comments and the means responsive to the comment number stored with the detected comment instruction number for fetching the corresponding stored comment data includes:
- means for detecting a comment number stored with the stored comment data;
- means responsive to the detected comment number for fetching additional corresponding comment data stored in the comment storage means; and
- whereby a plurality of chained comments may be displayed to the user in response to a single comment instruction.

* * * * *